United States Patent
Kounavis et al.

(10) Patent No.: US 11,657,162 B2
(45) Date of Patent: May 23, 2023

(54) ADVERSARIAL TRAINING OF NEURAL NETWORKS USING INFORMATION ABOUT ACTIVATION PATH DIFFERENTIALS

(71) Applicant: Intel Corporation, Santa Clara, CA (US)

(72) Inventors: Michael Kounavis, Portland, OR (US); Antonios Papadimitriou, Maplewood, NJ (US); Anindya Sankar Paul, Hillsboro, OR (US); Micah Sheller, Hillsboro, OR (US); Li Chen, Hillsboro, OR (US); Cory Cornelius, Portland, OR (US); Brandon Edwards, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1097 days.

(21) Appl. No.: 16/361,397

(22) Filed: Mar. 22, 2019

(65) Prior Publication Data
US 2019/0220605 A1 Jul. 18, 2019

(51) Int. Cl.
*G06F 21/60* (2013.01)
*G06N 3/08* (2023.01)
(Continued)

(52) U.S. Cl.
CPC .............. *G06F 21/60* (2013.01); *G06F 21/52* (2013.01); *G06N 3/0454* (2013.01); *G06N 3/08* (2013.01)

(58) Field of Classification Search
USPC .......... 726/26, 2, 21, 36; 713/150, 163, 181; 380/255, 264, 276
See application file for complete search history.

(56) References Cited

U.S. PATENT DOCUMENTS 7,587,598 B2 * 9/2009 Ohba .................... H04L 63/08
                                                713/169
7,917,758 B2 * 3/2011 Palekar ................. H04L 63/08
                                                709/227
(Continued)

FOREIGN PATENT DOCUMENTS

CN    111723927 A1    9/2020
EP      3712822 A1    9/2020

OTHER PUBLICATIONS

Extended European Search Report for EP Application No. 20157749.1 Ref No. I09539EP/CGS, dated Jul. 29, 2020, 9 pages.
(Continued)

*Primary Examiner* — Sharif E Ullah
(74) *Attorney, Agent, or Firm* — Jaffery Watson Mendonsa & Hamilton LLP

(57) ABSTRACT

In one example an apparatus comprises a memory and a processor to create, from a first deep neural network (DNN) model, a first plurality of DNN models, generate a first set of adversarial examples that are misclassified by the first plurality of deep neural network (DNN) models, determine a first set of activation path differentials between the first plurality of adversarial examples, generate, from the first set of activation path differentials, at least one composite adversarial example which incorporates at least one intersecting critical path that is shared between at least two adversarial examples in the first set of adversarial examples, and use the at least one composite adversarial example to generate a set of inputs for a subsequent training iteration of the DNN model. Other examples may be described.

21 Claims, 19 Drawing Sheets

(51) Int. Cl.
*G06N 3/04* (2023.01)
*G06F 21/52* (2013.01)

(56) References Cited

U.S. PATENT DOCUMENTS

| | | | | |
|---|---|---|---|---|
| 8,843,738 | B2* | 9/2014 | Vos | H04L 69/22 |
| | | | | 709/224 |
| 9,026,784 | B2* | 5/2015 | Buruganahalli | H04L 63/20 |
| | | | | 713/176 |
| 9,608,963 | B2* | 3/2017 | Lu | H04L 67/14 |
| 10,009,183 | B2* | 6/2018 | Pahl | G06F 21/33 |
| 10,670,890 | B2* | 6/2020 | Graff | G02C 5/2209 |
| 2008/0098207 | A1* | 4/2008 | Reid | G06F 11/3636 |
| | | | | 714/E11.207 |
| 2017/0268001 | A1* | 9/2017 | Khodarev | A61K 31/713 |
| 2018/0247195 | A1* | 8/2018 | Kumar | G06N 3/08 |
| 2018/0268222 | A1* | 9/2018 | Sohn | G06T 7/70 |
| 2018/0307188 | A1* | 10/2018 | Mummadi | G06N 3/0454 |
| 2018/0308012 | A1* | 10/2018 | Mummadi | G06N 3/0454 |
| 2018/0349324 | A1* | 12/2018 | Krappé | G06Q 30/0283 |
| 2019/0370440 | A1* | 12/2019 | Gu | G06N 3/0481 |
| 2020/0097853 | A1* | 3/2020 | Golovin | G06N 3/08 |
| 2020/0111018 | A1* | 4/2020 | Golovin | G06F 11/3409 |
| 2020/0167691 | A1* | 5/2020 | Golovin | G06N 3/08 |
| 2020/0242250 | A1* | 7/2020 | Chen | G06F 21/577 |
| 2021/0304009 | A1* | 9/2021 | Bazarsky | H03M 13/1545 |
| 2022/0004818 | A1* | 1/2022 | Koopman | G06K 9/6256 |
| 2022/0012572 | A1* | 1/2022 | Chen | G06N 3/063 |
| 2022/0043978 | A1* | 2/2022 | Wang | G06F 40/289 |
| 2022/0044283 | A1* | 2/2022 | Briancon | G06N 3/006 |
| 2022/0046057 | A1* | 2/2022 | Kutt | H04L 63/1483 |

OTHER PUBLICATIONS

Yulong Wang, et al., "Interpret Neural Networks by Identifying Critical Data Routing Paths", Eye In-Painting with Exemplar Generative Adversarial Networks, Jun. 1, 2018, pp. 8906-8914, XP055716197.

Communication pursuant to Article 94(3) EPC in EP Application No. 20157749.1 dated Apr. 4, 2022, 6 pages.

* cited by examiner

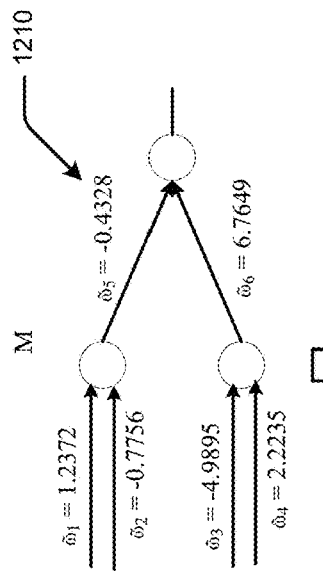
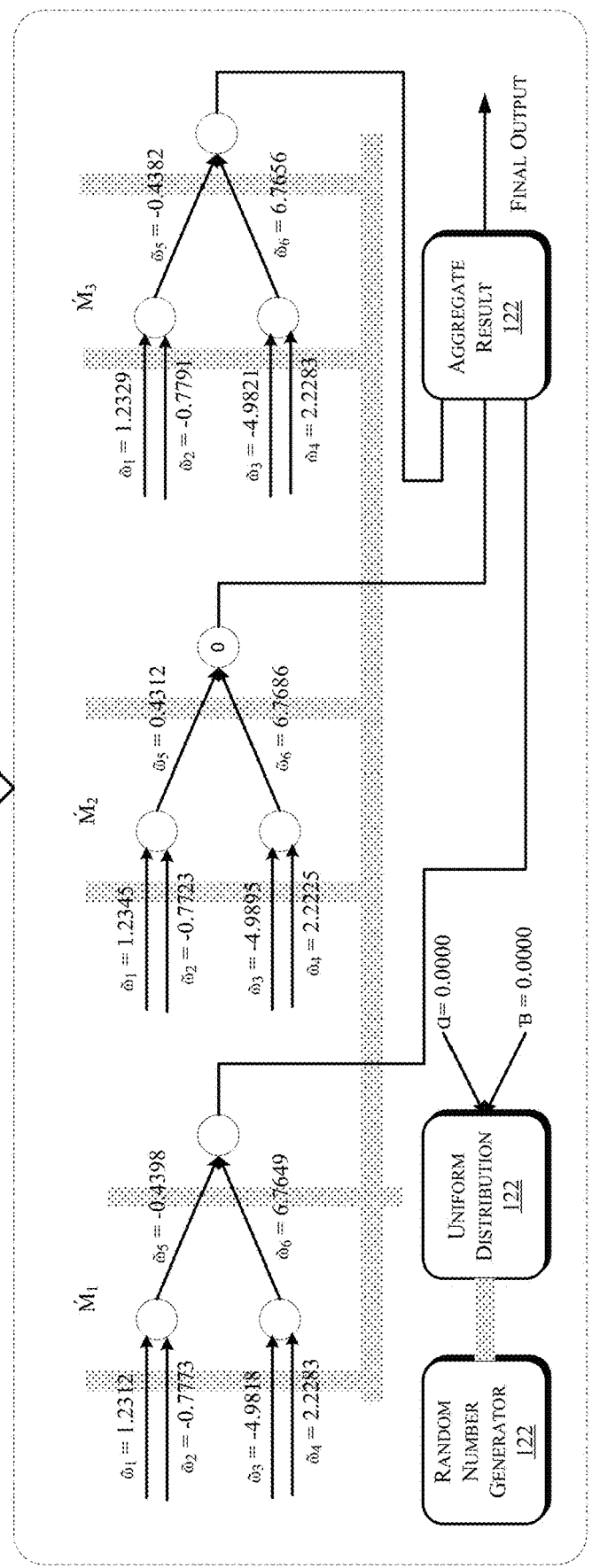
FIG. 12

```
Activation_Paths_BFS (M, A)

$AP_{total}(M,A) \leftarrow \emptyset$
repeat for all output vertices $o_j$
$v_t \leftarrow o_j$
for every edge $e_{v_i,v_t} \in V$ do
    if $\gamma(M,A,e_{v_i,v_t}) = 1$ // the edge is active
        $P \leftarrow e_{v_i,v_t}$
        push $\{P, v_i\}$
while stack is not empty do
    pop $\{P_t, v_t\}$
    if $v_t \in I$
        $AP_{total}(M,A) \leftarrow AP_{total}(M,A) \cup P_t$
    else
        for every edge $e_{v_i,v_t} \in V$ do
            if $\gamma(M,A,e_{v_i,v_t}) = 1$ // the edge is active
                $P_t \leftarrow P_t \cup e_{v_i,v_t}$
                push $\{P_t, v_i\}$
end while
end repeat // for all output vertices $o_j$
return $AP_{total}$
```

FIG. 13

ADVERSARIAL TRAINING OF NEURAL NETWORKS USING INFORMATION ABOUT ACTIVATION PATH DIFFERENTIALS

BACKGROUND

Subject matter described herein relates generally to the field of machine learning and more particularly to adversarial training of neural networks using information about activation path differentials within the neural networks.

Machine learning involves developing models and algorithms that can learn from, and make predictions based upon, input data. Machine learning algorithms rely upon deep neural networks (DNNs) which may utilize a cascade of many layers of artificial neurons, which may be implemented as non-linear processing units, in which each successive layer uses the output of the previous layer as an input.

Some examples of neural networks are vulnerable to attacks by the presence of subliminal signals in the input data which can cause serious harm by influencing the neural network cognition functions. Such signals may be crafted in various ways such as, for example, low-intensity perturbations to input data (e.g., image, speech, and natural language data) and may pass unnoticed by a human. Such signals can cause neural networks to misclassify their inputs and/or learn the wrong things from the environment. Inputs perturbed by such signals are commonly referred to as adversarial examples. Adversarial examples may be used to control model predictions at the direction of an adversary.

Accordingly, techniques to secure neural networks from attack by adversarial examples may find utility.

BRIEF DESCRIPTION OF THE DRAWINGS

The detailed description is described with reference to the accompanying figures.

FIGS. 11-12 are schematic illustrations of components utilized in a method to implement adversarial training of neural networks using information about activation path differentials in accordance with some examples.

FIG. 13 is an illustration of pseudo-code to determine activation paths in a neural network which may be utilized in a method to implement adversarial training of neural networks using information about activation path differentials in accordance with some examples.

DETAILED DESCRIPTION

Described herein are exemplary systems and methods to implement adversarial training of neural networks using information about activation path differentials in the neural networks. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

Figure 1:
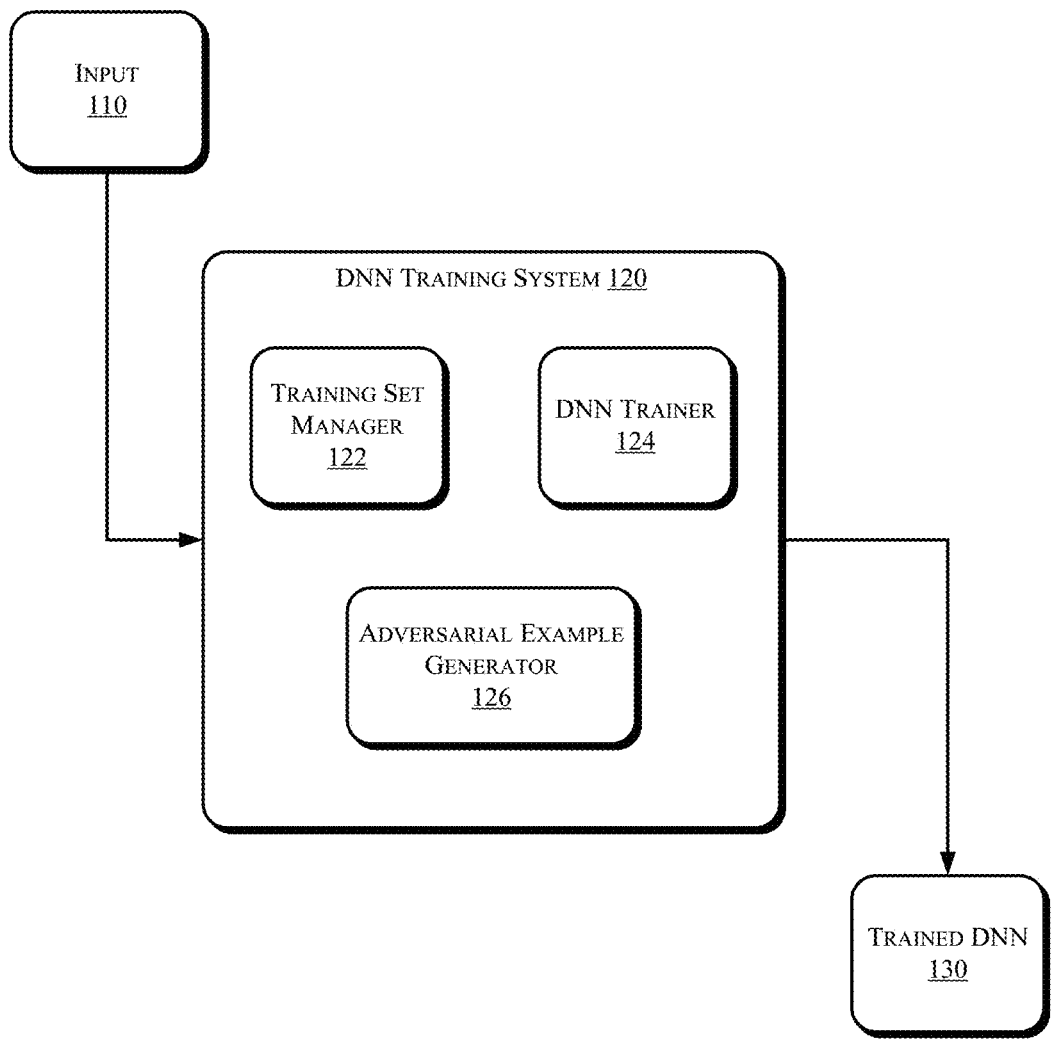
FIG. 1 is a schematic illustration of an operating environment which may be used to implement adversarial training of neural networks using information about activation path differentials, in accordance with some examples.

FIG. 1 is a schematic illustration of an operating environment which may be used to implement adversarial training of neural networks using information about activation path differentials, in accordance with some examples. Operating environment 100 may include deep neural network (DNN) training system 120. In operating environment 100, DNN training system 120 may include training set manager 122, DNN trainer 124, and adversarial example generator 126. In one or more embodiments described herein, DNN training system 120 may receive input 110 and produce a trained DNN 130 based on the input. Embodiments are not limited in this context.

In various embodiments, components of DNN training system 120 may interoperate to produce trained DNN 130. For example, creating trained DNN 130 may comprise generating one or more adversarial examples to attack a deep learning algorithm used for malware detection and/or performing iterative training on sequential DNNs with the adversarial examples. For example, training set manager 122 may determine a first training set based on input 110, DNN trainer 124 may then cause a first DNN to be trained to classify examples using the first training set. In some such examples, adversarial examples generator 126 may generate one or more adversarial examples that are misclassified by the first DNN. In one or more embodiments, the one or more adversarial examples may be generated using analytical attacks implemented by adversarial example generator 126. As will be described in more detail below, in one or more such embodiments, the analytical attacks implemented by adversarial example generator 126 may include causative attacks and evolution attacks. It should be noted that the phrase "adversarial examples" as used in this description may also refer to inputs that are not maliciously crafted, but represent collections of inputs that, due to unexpected factors (e.g., lighting background noise), cause the neural network to make incorrect predictions.

In some embodiments, the one or more adversarial examples that are misclassified by the first DNN may then be provided to training set manager 122 to include in a second training set. In various embodiments, the process of generating adversarial examples, determining an updated training set, and training a DNN with the update training set may be repeated such that an iteration parameter is satisfied. For instance, input 110 may include a numeric iteration parameter of five (5). In such instances, this may correspond to DNN training system 120 performing five iterations of generating adversarial examples, determining an updated training set, and training a DNN with the updated training set. In one or more embodiments, the DNN trained with a training set that includes the last round of adversarial examples generated may be output as trained DNN 130.

Figure 2A:
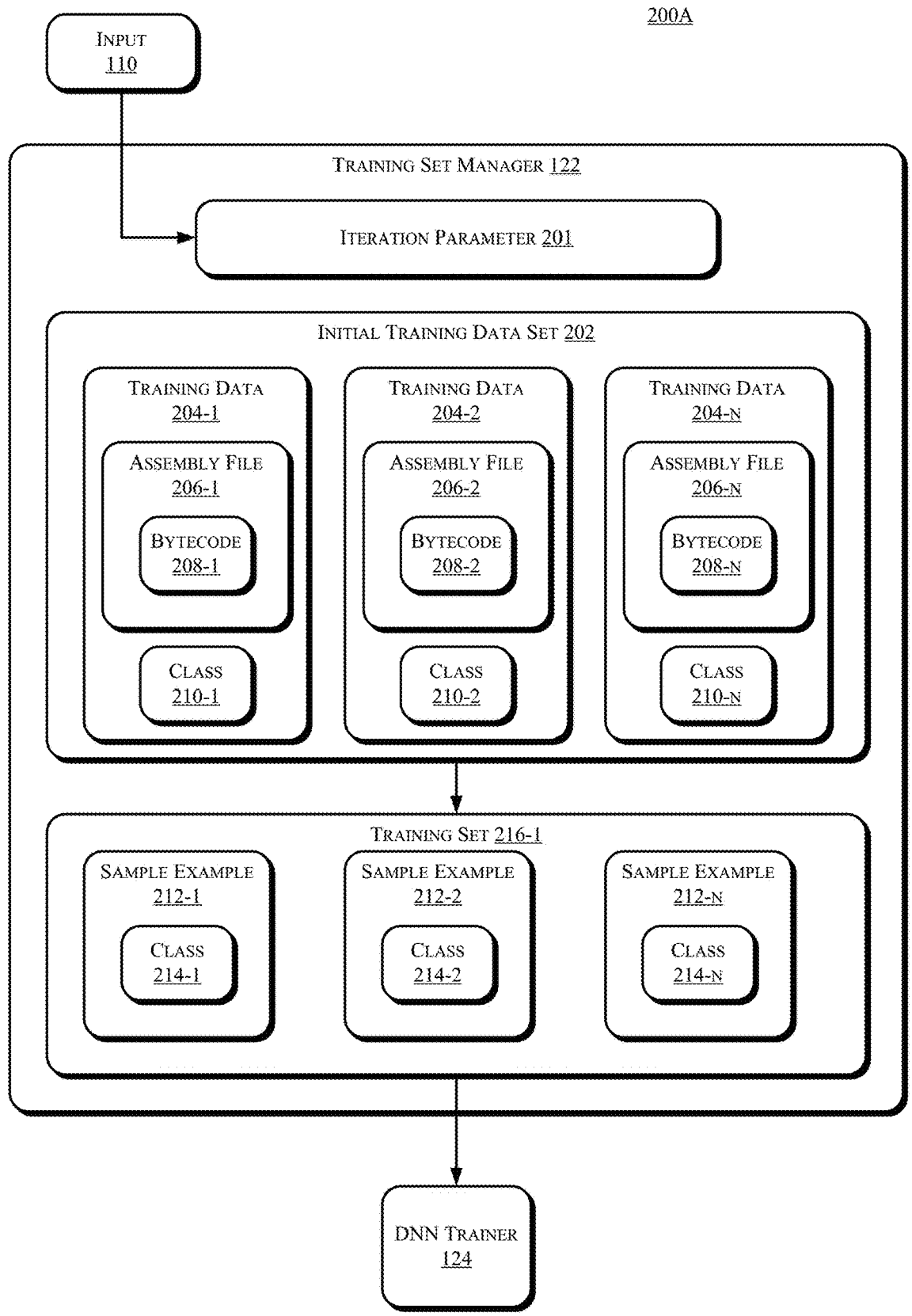
FIGS. 2A-2B are schematic illustrations of operating environments which may be used to implement adversarial training of neural networks using information about activation path differentials, in accordance with some examples.

FIG. 2A illustrates an example of an operating environment 200A that may be representative of various embodiments. Operating environment 200A may include training set manager 122 and DNN trainer 124. In operating environment 200A, training set manager 122 may receive iteration parameter 201 and initial training dataset 202 as input 101. In various embodiments described herein, training set manager 122 may convert initial training data set 202 into training set 216-1. In various such embodiments, training set 216-1 may be passed to DNN trainer 124 and utilized to train a DNN. In some embodiments, iteration parameter 201 may determine how many different training sets are created for training DNNs. Embodiments are not limited in this context.

In one or more embodiments, initial training dataset 202 may include one or more pieces of training data 204-1, 204-2, 204-n (i.e., training data 204). In one or more such embodiments, some or all pieces of training data 204 in initial training dataset 202 may include an assembly file (e.g., assembly files 206-1, 206-2, 206-n or assembly files 206) comprising bytecode (e.g., bytecode 208-1, 208-2, 208-n or bytecode 208). In various embodiments, each piece of training data may be associated with a class (e.g. class 210-1, 210-2, 210-n or classes 210). In various such embodiments, the associations of class may be used in a deep learning algorithm to train a DNN. For instance, the DNN may be trained to detect malware. In such instances, the classes 210 may include 'malware' and 'non-malware'.

In various embodiments, training set manager 122 may convert initial training dataset 202 into training set 216-1. In various such embodiments, training data 204-1, 204-2, 204-n may be converted into sample examples 212-1, 212-2, 212-n (i.e., sample examples 212), respectively. In some embodiments, training set manager 122 may convert training data into sample examples by directly translating the associated bytecode into pixel intensity. In one or more embodiments, sample examples 212-1, 212-2, 212-n may include classes 214-1, 214-2, 214-n (i.e., classes 214), respectively. In one or more such embodiments, classes 214 may be the same or similar to the class (e.g., class 210-1, 210-2, 210-n) that corresponds to the bytecode used to create the sample examples. In various embodiments, classes 210 may be a subset of classes 214. In other embodiments, classes 214 may be a subset of classes 210.

In some embodiments, training set manager 122 may receive initial training dataset 202 and iteration parameter 201 as input 101. In various embodiments, initial training dataset 202 may include uncontaminated data samples with K-classes. In one or more embodiments, iteration parameter 201 may include a 1-bit parameter, M, used to specify the number of iterations to harden the DNN. Once the initial training dataset 202 is converted into training set 216-1, training set 216-1 may be provided to DNN trainer 124 for training a first round DNN.

Figure 2B:
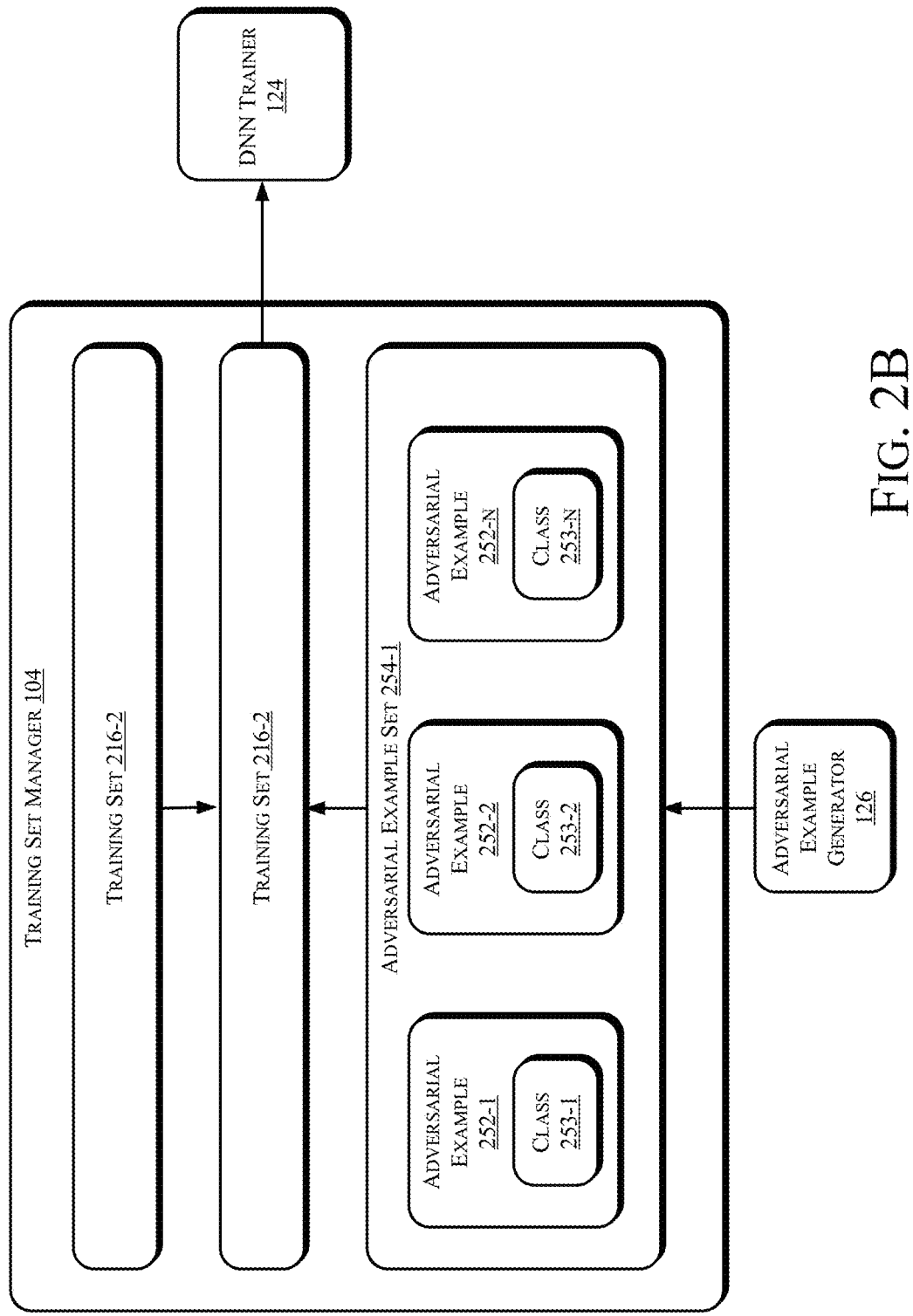

FIG. 2B illustrates an example of an operating environment 200B that may be representative of various embodiments. Operating environment 200B may include training set manager 122, DNN trainer 124, and adversarial example generator 126. In operating environment 200B, training set manager 122 may determine training set 216-2 based on training set 216-1 and adversarial example set 254-1. Thus, in operating environment 200B, adversarial example set 254-1 was previously generated, such as by adversarial example generator 126, based on analytical attacks performed on a DNN trained with training set 216-1. Embodiments are not limited in this context.

In various embodiments, training set manager 122 may receive adversarial example set 254-1 from adversarial example generator 126. In one or more embodiments, adversarial examples 252-1, 252-2, 252-n may each be associated with a class 253-1, 253-2, 253-n (i.e., classes 253), respectively. In one or more such embodiments, each of the classes 253 may be different from classes 210. Accordingly, in various embodiments, training set 216-2 may include K+1 classes, as opposed to the K classes of training set 216-1. For instance, classes 210 may include 'malware' or 'non-malware' while classes 253 include 'causative adversarial example' and 'evolution adversarial example'. In some embodiments, classes 253 may all be the same class, such as 'adversarial example'.

In some embodiments, training set manager 122 may determine training set 216-2 based on training set 216-1 and adversarial example set 254-1. In one or more embodiments described herein, training set manager 122 may include one or more sample examples 212 of training set 216-1 and one or more adversarial examples 252-1, 252-2, 252-n (i.e., adversarial examples 252) of adversarial example set 254-1 in training set 216-2. In various embodiments, training set 216-2 may include each sample example 212 of training set 216-1 and each adversarial example 252 of adversarial example set 254-1. In some embodiments, training set manager 122 may then provide training set 216-2 to DNN trainer 124 to train a second DNN.

Figure 3A:
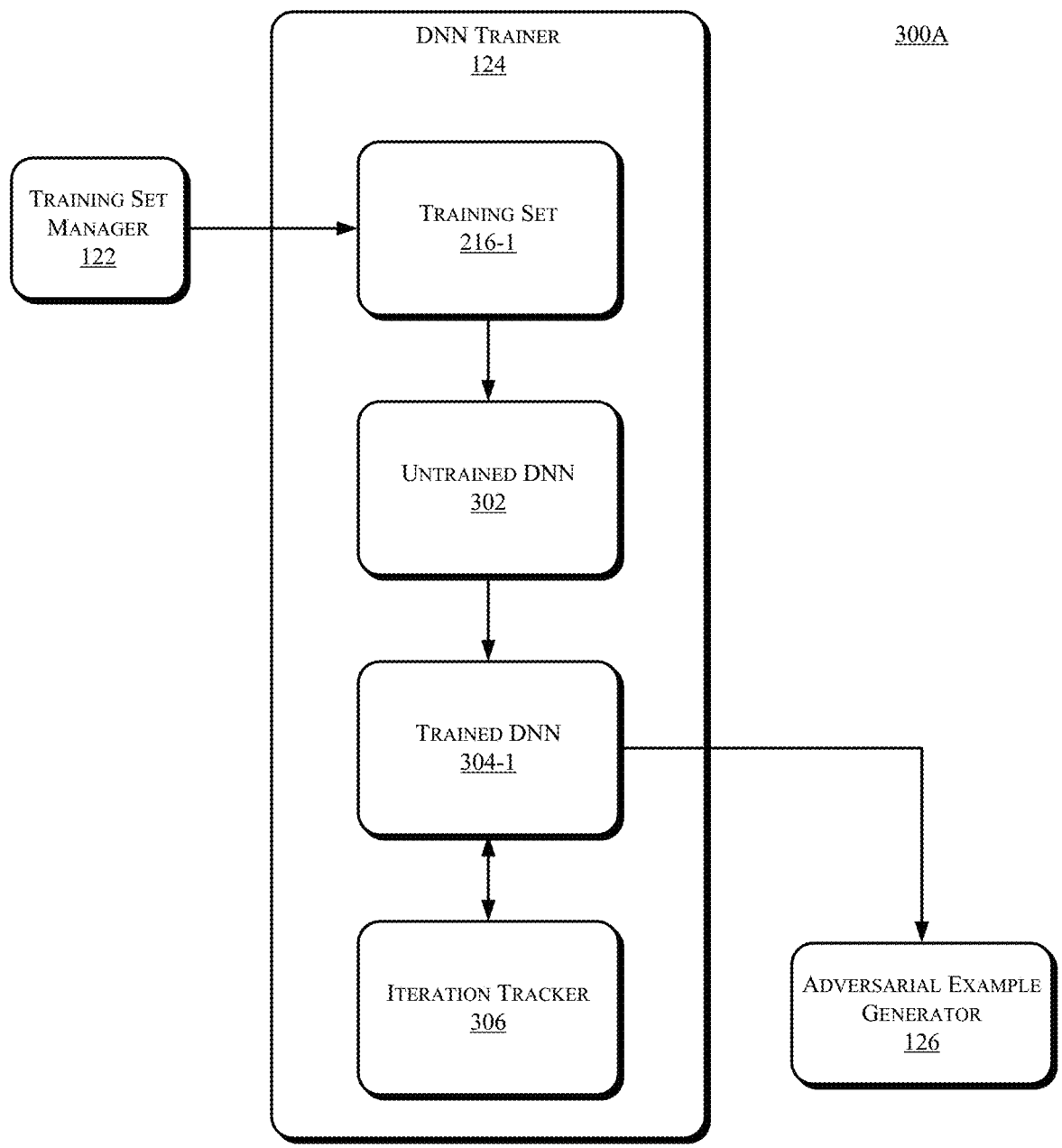
FIGS. 3A-3B are schematic illustrations of operating environments which may be used to implement adversarial training of neural networks using information about activation path differentials, in accordance with some examples.

FIG. 3A illustrates an example of an operating environment 300A that may be representative of various embodiments. Operating environment 300A may include training set manager 122, DNN trainer 124, and adversarial example generator 126. In operating environment 200A, DNN trainer 124 may receive training set 216-1 from training set manager 122. In the illustrated embodiments, DNN trainer 124 may include trainer set 216-1, untrained DNN 302, trained DNN 304-1, and iteration tracker 306. In various embodiments described herein, DNN trainer 124 may use training set 216-1 on an untrained DNN 302 to produce trained DNN 304-1. In various such embodiments, untrained DNN 302 may include a deep learning algorithm to which training set 216-1 is provided as input. In some such embodiments, based on the training set 216-1, the deep learning algorithm may generate trained DNN 304-1. Embodiments are not limited in this context. In some embodiments, DNN trainer 124 may receive training set 216-1 from training set manager 122. In some such embodiments, training set 216-1 may be applied to untrained DNN 302 to produce trained DNN 304-1. In various embodiments, iteration tracker 306 may track the number of iterations DNN training system 120 has performed. In various such embodiments, iteration tracker 306 may determine the desired number of iterations based on iteration parameter 201. In operating environment 300A, iteration tracker 306 may determine more iterations are to be performed. For instance, iteration tracker 306 may include a counter that it initial set to match the iteration parameter 201. In such instances, each time a trained DNN is generated, the counter may be decremented. In some such instances, if the counter is above zero, the trained DNN may be provided to adversarial example generator 126. In other such instances, if the counter value is zero, the trained DNN may be output as trained DNN 150.

In various embodiments, trained DNN 304-1 may be a convolutional neural network capable of classifying malware represented as examples generated from corresponding bytecode. In various such embodiments, resizing the width and/or height of the examples may not significantly affect classification accuracy. In some embodiments, trained DNN 304-1 may have a multi-layer perceptron architecture. In one or more embodiments, trained DNN 304-1 may perform a two-class classification task.

Figure 3B:
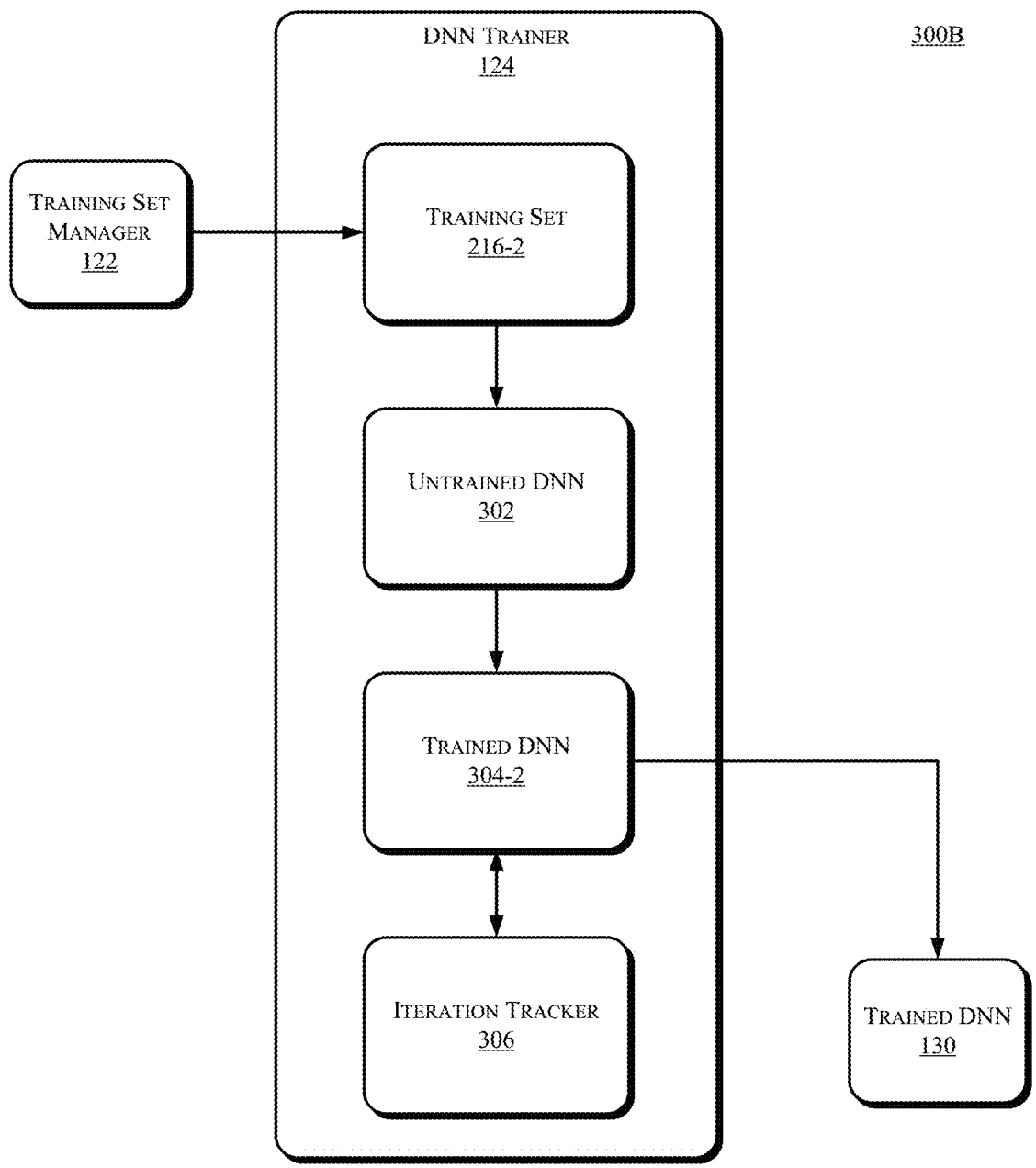

FIG. 3B illustrates an example of an operating environment 300B that may be representative of various embodiments. Operating environment 300B may include training set manager 122 and DNN trainer 124. In operating environment 300B, DNN trainer 124 may utilize training set 216-2 received from training set manager 122 to generate trained DNN 304-2. In the illustrated embodiments, trained DNN 304-2 is output as hardened DNN 150. In such embodiments, trained DNN 304-2 may be output as hardened DNN 150 in response to iteration tracker 306 determine the appropriate number of iteration have been performed. Thus, in operating environment 200B, iteration parameter 201 was set to two. However, it will be appreciated that, in other embodiments, iteration parameter 201 may be set to any positive integer. Embodiments are not limited in this context.

Figure 4:
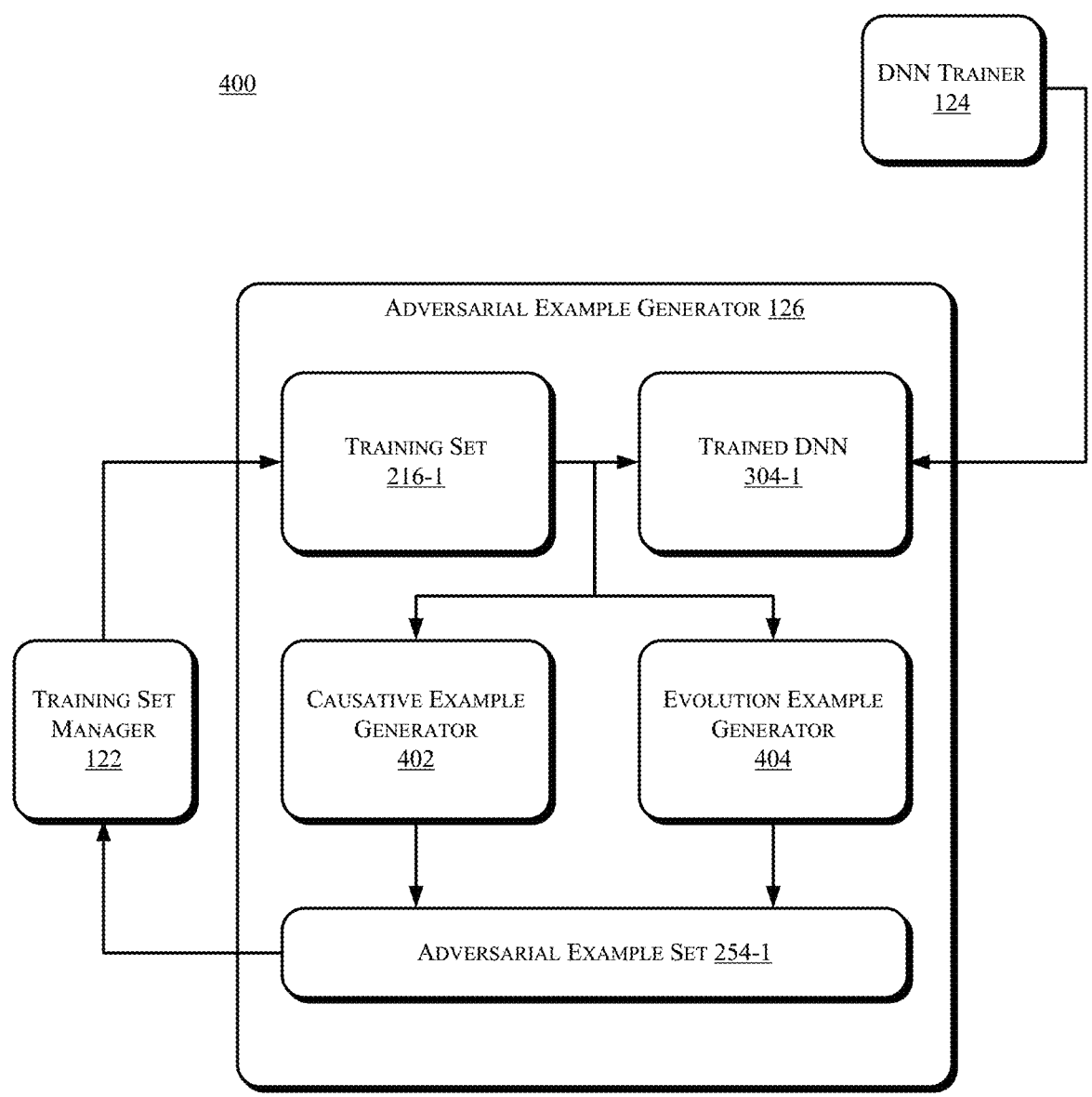
FIG. 4 is a schematic illustration of an operating environment which may be used to implement adversarial training of neural networks using information about activation path differentials, in accordance with some examples.

FIG. 4 illustrates an example of an operating environment 400 that may be representative of various embodiments. Operating environment 400 may include training set manager 122, DNN trainer 124, and adversarial example generator 126. In operating environment 400, adversarial example generator 126 may include causative example generator 402 and evolution example generator 404. In the illustrated embodiments, adversarial example generator 126 may receive training set 216-1 from training set manager 122 and trained DNN 304-1 from DNN trainer 124. In various embodiments described herein, causative example generator 402 and evolution example generator 404 may perform analytical attacks on trained DNN 304-1 to produce adversarial example set 254-1. It will be appreciated that adversarial example generator 126 produces an adversarial example set on any iteration of trained DNN. For instance, training set 216-2 and trained DNN 304-2 may be utilized by causative example generator 402 and evolution example generator 404 to produce an adversarial example set 254-2 (not shown). Embodiments are not limited in this context.

In one or more embodiments, causative example generator 402 may perform causative analytical attacks on trained DNN 304-1 to generate one or more adversarial samples or examples in set 254-1 and/or evolution example generator 404 may perform evolution analytical attacks on trained DNN 304-1 to generate one or more adversarial examples in set 254-1. Generally, the analytical attacks may include, for instance, altering one or more portions of a base example (e.g., sample example 212-n) to generate a test example; providing the test example to the trained DNN (e.g., trained DNN 304-1) for classification; and include the test example as an adversarial example (e.g., adversarial example 252-2) in adversarial example set 254-1 when the trained DNN classifies the test example as something different than target classification or class. In some embodiments, the target classification may be the class of the base example. In one or more embodiments, adversarial examples or samples may come in two general varieties. In one or more such embodiments, the first variety may include malware samples that look very close to clean samples and the second variety may include clean samples that look very close to malware samples. In various embodiments, the first variety may pass undetected by an unhardened DNN and the second variety may increase false positives.

In some embodiments, causative example generator 402 may carry out a causative attack as follows. Given a valid input x (e.g., sample example 212-1), find a similar x' such that the classification output $C(x) \neq C(x')$, but x and x' are close according to some distance metric. In various embodiments, the causative attack seeks to change the smallest number of pixels, such as in sample example 212-2, that results in the trained DNN classifies x' different than x. In one or more embodiments, causative attacks may be implemented via a fast gradient sign method. In one or more such embodiments, the fast gradient sign method may be defined as $x'=x-a \cdot sign(gradient(loss(x)))$. In some embodiments, the fast gradient sign method may enable quick and efficient generation of adversarial examples. In various embodiments, causative attacks, such as those performed by causative example generator 402, may produce adversarial examples that are classified as benign examples.

In various embodiments, evolution example generator 404 may carry out an evolution attack as follows. Consider the collection of sample examples (e.g., sample examples 212) as a population. Given a valid input x, find a dissimilar x' using an evolution algorithm such that x' is white-noise, but classifies as a valid label by the trained DNN. In some embodiments, in each iteration, the evolution algorithm may choose a random organism (e.g., sample example 212-n), mutates it randomly, and replaces it based on optimizing a fitness function. In one or more embodiments, evolution attacks may be implemented using multi-dimensional archive of phenotypic elites (MAP-elites). In one or more such embodiments, the MAP-elites may enable simultaneous evolution on a population that contains individuals that score well.

In one or more embodiments, the analytical attacks and/or adversarial examples may become guidance on changing or injecting code in the assembly file (e.g., assembly file 206-2). In one or more such embodiments, changing or injecting code in an assembly file may be targeted at avoiding being classified as malware by the trained DNN. In one or more such embodiments, the position in the assembly file may be approximated using a sliding window technique on the examples. In various embodiments, the sliding window technique may be used on the base example (e.g., sample example that misclassified test example is based on). In various such embodiments, the perturbed or altered portion may be the patch identified by the sliding window technique. In some embodiments, this may be used to determine which portion of the bytecode has the heaviest weight when it comes to the trained DNN making a prediction.

In various embodiments, if the patch is larger, it may contain places for code injection in the corresponding assembly file. In one or more embodiments, the position identified in a base example by the sliding window technique are pixels that do not map exactly back to the assembly file, which is text. Accordingly, in one or more such embodiments, the portion identified by the sliding window technique approximates the portions of the assembly file that has bytecode that needs to be changed. In some embodiments, validity of code modifications/injections may be evaluated using symbolic execution. In some such embodiments, the deep learning algorithm's accuracy may decrease and false positive rate may include when adversarial examples are included for classification.

In some embodiments, DNN training system 120 may be targeted at enhancing deep learning resiliency against analytical attacks. Hence, as a defense mechanism, DNN training system 120 may rebuild iterative layers of DNNs and/or utilize the adversarial examples to enhance robustness of the deep learning algorithm. In one or more embodiments, operation of DNN training system 120 may proceed as follows. The inputs (e.g., input 101) to the first DNN, DNN1, may be uncontaminated data samples or examples with K classes and a 1-bit parameter M to specific the number of iterations to harden the DNN (e.g., iteration parameter 201). DNN1 may be trained on the uncontaminated data samples. The DNN training system 120 may then generate adversarial examples, such as ones constructed by causative and evolution attacks. These attacks may modify the uncontaminated data samples (e.g., base examples) slightly to produce test examples. When DNN1 classifies a test example in a wrong class (e.g., not the target class), the test example may be identified as an adversarial example and included in an adversarial example set (e.g., adversarial example set 254-1). In some embodiments, the adversarial examples may be added to a subsequent training set (e.g., training set 216-2) as a new class. In such embodiments, training set 216-2 would have K+1 classes.

In one or more embodiments, a second DNN, DNN2, may be trained on training set 216-2. In one or more such embodiments, causative example generator 402 and evolution example generator 404 may then perform analytical attacks on DNN2. In various embodiments, DNN training system 120 may repeat the process until the number of iterations M is reached. For example, in malware analysis, the inputs may be the malware examples and an iteration parameter of 8. In such examples, DNN1 may be trained on the collection of malware examples. In some embodiments, a 2-layer perceptron (2-MLP) may be utilized. In some such embodiments, the 2-MLP may be utilized based on speed considerations.

In some embodiments, depending on data size, different architectures for the DNNs may be utilized. For instance, for MLP, the number of layers may be varied. In another instance, for LeNet, filter sizes may be changed. In one or more embodiments, the DNN training system 120 may then launch adversarial attacks using causative and evolution attacks to determine adversarial examples. In various embodiments, implementation of the causative attack may be based on minimizing an L-infinity or Chebyshev distance of an adversarial example. In some embodiments, the perturbed or altered portion may become guidance on changing associated bytecode. In some such embodiments, the position in the assembly file of the bytecode may be approximated via a sliding window technique performed on the examples. In one or more embodiments, validity may be evaluated using symbolic execution. In various embodiments, after validation, a new training set is created that includes the adversarial examples, and thus the resulting training set has K+1 classes. In various such embodiments, DNN2 may be trained on the resulting training set with K+1 classes, and repeat this process until DNN8 is trained. In some embodiments, DNN8 may be output as hardened DNN 150. In one or more embodiments, classification of adversarial examples may improve within five iterations.

In various embodiments, the DNN training system 120 can defend a variety of analytical attacks on deep learning. In some embodiments, DNN training system 120 may be applicable to improve the resiliency of deep learning used in one or more of autonomous driving, computer vision, speech recognition, the internet of things, and malware detection. For example, with respect to autonomous driving, when the camera of the autonomous vehicle takes a real-world example, but an attack perturbs the smallest number of pixels in the example, then an unhardened machine learning algorithm used by the vehicle is likely to misclassify the example. In such examples, this misclassification can lead to accidents. Accordingly, in one or more embodiments, DNN training system 120 may prevent dangerous consequences resulting from a misclassification from happening. In various embodiments, overcoming adversarial examples with DNN training system 120 can avoid security problems and/or give deep learning algorithms a more accurate understanding of the tasks they solve.

As described above, some examples of neural networks are vulnerable to attacks by the presence of subliminal signals in the input data which can cause serious harm by influencing the neural network cognition functions. Such signals may be crafted in various ways such as, for example, low-intensity perturbations to input data (e.g., image, speech, and natural language data) and may pass unnoticed by a human. Such signals can cause neural networks to misclassify their inputs and/or learn the wrong things from the environment. Inputs perturbed by such signals are commonly referred to as adversarial examples. Adversarial examples may be used to control model predictions at the direction of an adversary.

Subject matter described herein addresses issues associated with of securing Artificial Intelligence (AI) systems such as DNNs against adversarial attacks. A growing number of studies have shown that neural networks are vulnerable to the presence of subliminal signals, which can cause serious harm by influencing the neural network cognition functions. Such signals can be crafted in various ways such as through low-intensity perturbations to input data (e.g., image, speech, and natural language data) and pass unnoticed by the human. Such signals are capable of making neural networks misclassify their inputs or learn the wrong things from the environment. Inputs perturbed by such signals are called 'adversarial examples'. Adversarial example have the ability to fully control model predictions as per the wish of an adversary. Adversarial examples can be produced by sophisticated attacks such as the Fast Gradient Sign Method (FGSM), the Projected Gradient Descent (PGD) method, the Carlini Wagner (CW) method and others.

Some existing techniques that address this problem enhance the training process with correctly labeled adversarial examples produced by known attacks. These defense techniques essentially guide the training process to perceive adversarial examples as such and classify them correctly. Such techniques suffer from the disadvantage that the number of adversarial examples required may be significantly large, rendering the defenses impractical, and by the reported of loss of accuracy associated with adversarially trained networks. Such loss of accuracy is associated with the fact that neural networks have limited, albeit large, learning capacity.

Subject matter described herein aims to address issues including: (i) that it is difficult to adversarially train networks with a reasonable number of examples and with guarantees for convergence at saddle points, (ii) that it is difficult to guarantee convergence under certain time budgets while protecting against determined adversaries; and (iii) that It is difficult for adversarial training techniques to provide some visibility to the internals of the network, or to provide some metrics to reflect on and learn from, when attacks succeed.

Techniques described herein provide effective adversarial training for deep neural networks by taking into consideration 'under the hood' information about the state of the networks. More particularly, techniques described herein address the problem of computing the most essential of adversarial examples required for making neural networks robust against adversarial attacks using information about activation path differentials. Activation path differentials reflect differences in the internal state of neurons associated with different attacks vs. benign examples. Such differentials indicate the most vulnerable paths inside neural network topologies that make attacks effective. These are the paths through the network that need to be protected most via adversarial training. Techniques described herein use this information to craft fewer and more effective adversarial examples, potentially improving the adversarial training process substantially in terms of both robustness and computational speed.

Techniques described herein combine concepts from cryptography with concepts from machine learning. Differential cryptanalysis is a security methodology which has been extensively applied to crypto systems in the past, especially to the analysis of block ciphers and one-way hash functions. Techniques described herein apply differential analysis techniques to machine learning and specifically machine learning security. By analyzing activation path differentials between adversarial and benign examples, the most vulnerable paths inside a neural network topology that need protection can be identified. This information can be used to craft adversarial examples that modify the training process to especially guard these vulnerable paths.

Figure 5:
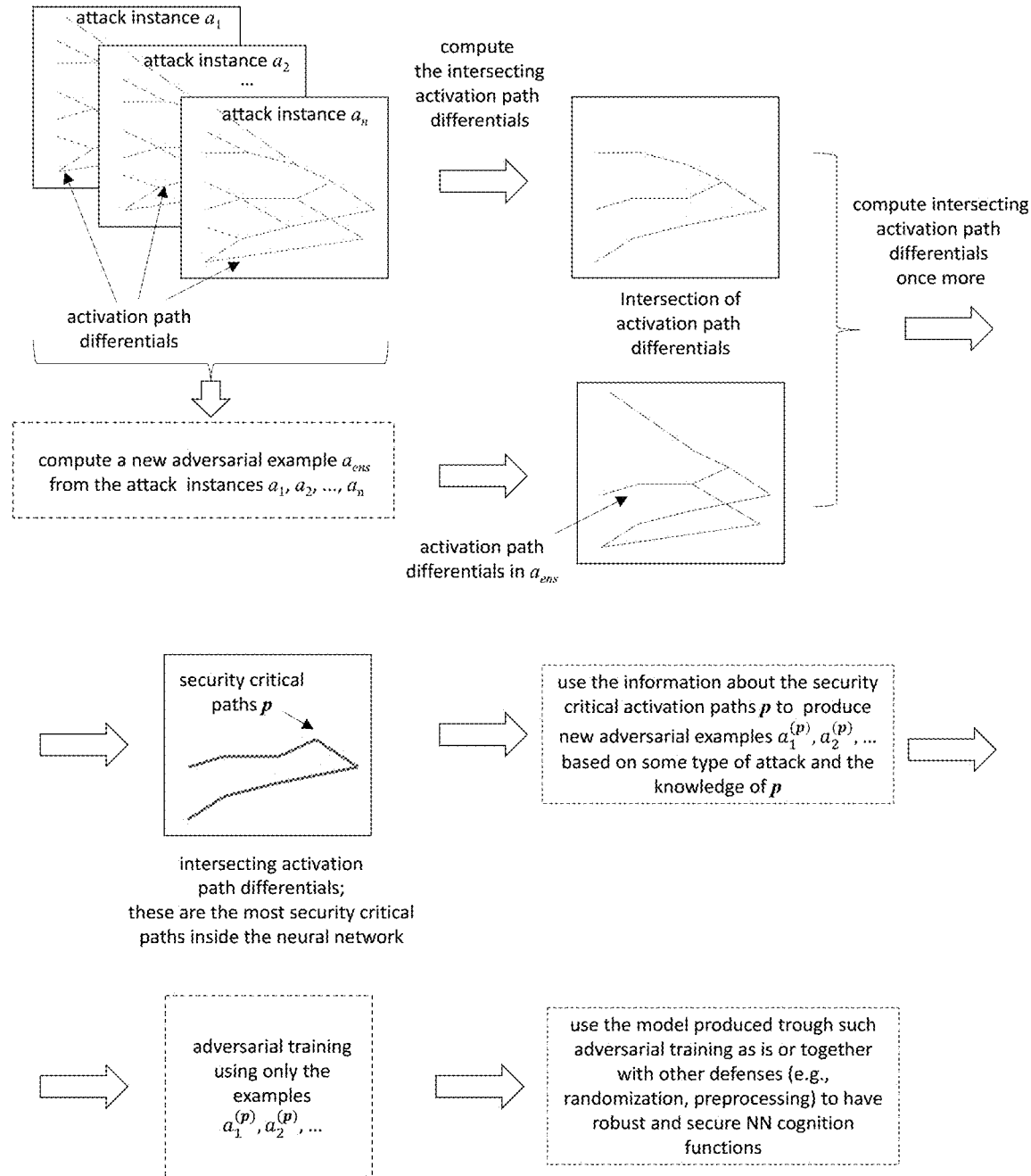
FIG. 5 is a schematic illustration of a high-level overview of techniques to implement adversarial training of neural networks using information about activation path differentials, in accordance with some examples.

FIG. 5 is a schematic illustration of a high-level overview of techniques to implement adversarial training of neural networks using information about activation path differentials, in accordance with some examples. As described above, techniques described herein utilize information about activation path differentials in DNNs to provide security against adversarial attacks. The use of activation path differentials enables a more intelligent computation of which adversarial examples are the most essential to use in an adversarial training defense process.

Referring to FIG. 5, several instances of an attack are performed producing a plurality of adversarial examples a1, a2, . . . , an 510. For example, the attacks may be performed using the same input on pseudo-random instances of a functioning network. Such pseudo-random instances may be produced by replacing the low order weight mantissa bits of the network's model with random values, by preprocessing training data with random selections of per-block JPEG quality values, by injecting noise on the training data, or by combinations of such methods. Conversely adversarial examples a1, a2, . . . , an 510 may be produced by using different inputs on the same functioning network.

Next, activation path differentials 515 associated with each of the adversarial examples a1, a2, . . . , an are computed. As used herein, the phrase 'activation paths' refers to paths of a neural network topology, which are comprised of neurons that (i) operate in their active region; and (ii) the outputs of which are not muted by subsequent max pooling operations. The phrase 'activation path differentials' refers to differences observed between two sets of activation paths, each of which characterizes a different operation of the same neural network (e.g., with and without adversarial perturbations superimposed on its input). The intersection of the activation path differentials coming from a1, a2, . . . , an is further computed in this step.

Next, a new adversarial example aens 520 which is the ensemble of the adversarial examples a1, a2, . . . , an is computed. In some examples the computation may be performed by using as optimization objective the minimization of the loss function Lens which is the sum $L_{ens}=\Sigma_{i=1}^{n}L_{i}$ of the loss functions L1, L2, . . . , Ln characterizing each of the attacks that produce a1, a2, . . . , an respectively. The adversarial example aens is the one that performs best in attack situations associated with all examples a1, a2, . . . , an. Next, the intersection IV 525 of the activation path differentials coming from aens and a1, a2, . . . , an 510 is computed. The intersection represents the most security critical paths or most vulnerable paths of a neural network topology. It is precisely these paths that we use for the computation of adversarial examples in this invention disclosure.

Next, known attacks such as the projected gradient descent (PGD) or Carlini Wagner (CW) attacks may be modified to accommodate knowledge about the security critical paths p=IV. The modified attacks produce adversarial examples that strengthen the flow of differential signals along these paths.

Techniques described herein simplify the cost of adversarial training and increase its effectiveness by focusing only on paths which are associated with essential visual changes. Such changes are those that convert an object from a benign class A to an adversary's target class B (i.e., early gradual modifications on edges, color, texture etc.).

Figure 6:
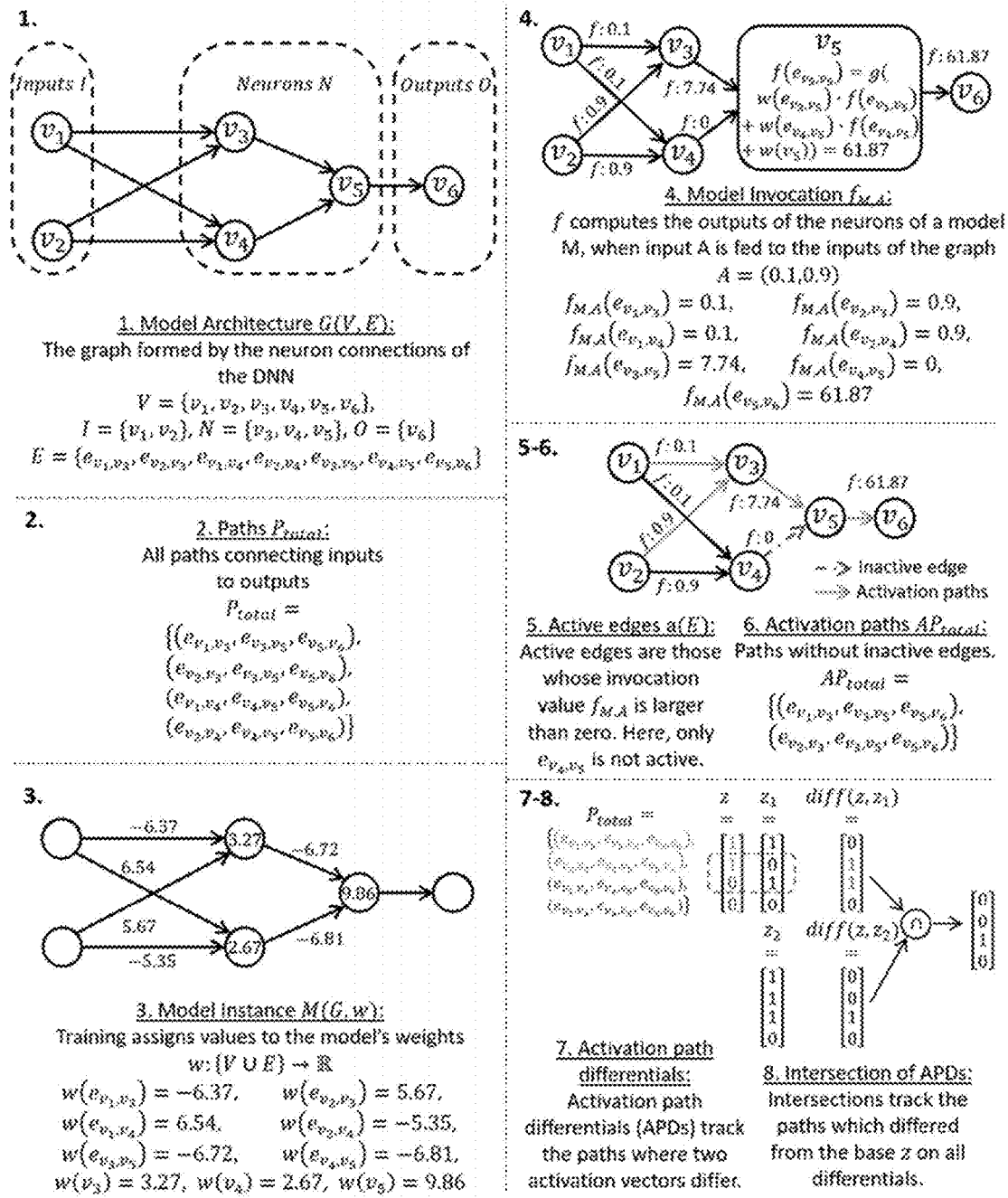
FIG. 6 is a schematic illustration of a high-level overview of techniques to implement adversarial training of neural networks using information about activation path differentials, in accordance with some examples.

FIG. 6 is a schematic illustration of a high-level overview of techniques to implement adversarial training of neural networks using information about activation path differentials, in accordance with some examples. Various concepts and definitions will be explained with reference to FIG. 6.

Referring to FIG. 6, a deep neural network (DNN) 610 is represented as a directed graph G, having a set of vertices V, and a set of edges E. The model architecture G is further constructed as follows: (1) each input and output interface of the DNN is mapped to a vertex in V. The set of vertices corresponding to inputs is denoted as L and those that correspond to outputs as O; (2) each neuron of the DNN is also mapped to a vertex in V; (3) the set of vertices corresponding to neurons is denoted as N. Set of all vertices V is equal to I∪N∪O. Thus: (1) if $v_i \in N$ and $v_j \in N$, then edge $e\_(v_i, v_j) \in E$, if the output of neuron $v_i$ is fed as input to neuron v_j; (2) if $v_i \in I$ and $v_j \in N$, then $e\_(v_i, v_j) \in E$, if input interface $v_i$ is fed as input to neuron $v_j$; and (3) if $v_i \in N$ and $v_j \in O$, then $e(v_i, v_j) \in E$, if output of neuron $v_i$ is assigned to output interface $v_j$.

The DNN model can be extended to include normalization, max-pooling, and softmax processing steps. Such steps are omitted in the interest of conciseness, but they can be considered part of the processing performed by the neurons. A model architecture also defines the components of DNN but not the actual parameter values of the DNN (i.e., the weights, thresholds and biases). These parameters are determined by training the model using a dataset.

The term "paths", as used herein, refers to acyclic paths that connect inputs to outputs of the DNN. We formally define a path $P_{vi, vj}$ from node $v_i$ to node $v_j$ in an inductive way:

$(\emptyset, e_{vi, vj})$ is a path from $v_i$ to $v_j$ if $e_{vi, vj} \in E$.

$(P_{vi, vj}, e_{vj, vk})$ is a path from $v_i$ to $v_k$ if $P_{vi, vj}$ is a path from $v_i$ to $v_j$ and $e_{vj, vk} \in E$ but $e_{vj, vk} \notin P_{vi, vj}$.

For brevity, a path $(((\emptyset, e_{vi, vj}), e_{vj, vk}), e_{vk, vl})$ may be denoted as $(e_{vi, vj}, e_{vj, vk}, e_{vk, vl})$.

As mentioned earlier, of primary interest are the set of all paths that connect inputs of the DNN to outputs of the DNN. This set may be denoted as $P_{total}$ and defined as:

$$P_{total} = \{P_{vi,vj} | v_i \in I \text{ and } v_j \in O\}$$

Paths in $P_{total}$ are acyclic because the above definition does not allow duplicate edges in paths, and because DNN outputs do not have any outgoing connections.

The phrase "model instance" as used herein refers to a model architecture G trained using a specific dataset D, to determine the values of all parameters of the DNN. In the graph-based model describe herein, the result of training process is a function $w: V \cup E \rightarrow \mathbb{R}^n$ which takes as input a vertex or an edge of the graph and returns a real value or vector of real values that corresponds to the parameter assigned to that vertex or edge during training. The model architecture G along with the function w defines the instance of a model $M(G,w)$.

The phrase "model instance invocation" as used herein refers to an instance $M(G,w)$, one can feed a particular input to it and get a response. To investigate this behavior in a graph-based model, an 'invocation' function $f$ may be defined that takes as input the instance M, a vector A of $|I|$ input values, and a specific edge $e_{vi,vj}$, and returns the signal value which comes out of the particular edge $e_{vi,vj}$ during an invocation of the model. More precisely, function $f: M(G, w) \times \mathbb{R}^{|I|} \times E \rightarrow \mathbb{R}$ is also defined in a recursive way:

If $vi \in I$, then $f(M, A, e_{vi,vj}) = ai$, where $A = (a1, a2, \ldots, ai, \ldots, a|I|)$ If $vi \in (V \setminus I) \cap (V \setminus O)$, then $\forall vj$ such that $e_{vi,vj} \in E$, i.e., every outgoing edge of vi, $f(M, A, e_{vi,vj}) = g(\Sigma w(e_{vk,vi}) * f(e_{vk,vi}) k \in IN(v_i) + w(v_i))$, where g is the activation function of the DNN, $w(e_{vk,vi})$ is the synaptic weight associated with edge $e_{vk,vi}$, $w(v_i)$ is the bias at vertex $v_i$ and $IN(v_i)$ is the set of all incident nodes to $v_i$. The activation function of the DNN can be, for example, a ReLU and can be considered combined with a max pooling step. Applying this definition recursively evaluates all the neurons of the DNN.

The phrase "active edges" as used herein refers to, given an invocation $f$ of a model instance $M(G,w)$ and an input $A = (a_1, a_2, \ldots, a_i, \ldots, a_{|I|})$, an edge $e_{vi,vj}$ is active, if $f(M, A, e_{vi,vj}) > 0$. We will use function $\gamma: E \rightarrow \{0,1\}$ to mark edges as active ($\gamma(M, A, e_{vi,vj}) = 1$) or inactive ($\gamma(M, A, e_{vi,vj}) = 0$).

The phrase "activation paths" as used herein refers to a path in the set $P_{total}$ whose edges are all active. Formally, P is an activation path if $P \in P_{total}$ and $\gamma(M, A, e_{vi,vj}) = 1$ $\forall e_{vi,vj} \in P$. We distinguish some paths that are activation paths from others using the function $\Gamma(P, M, A)$. Specifically, $\Gamma(P, M, A) = 1$ for active paths and $\Gamma(P, M, A) = 0$ for inactive paths. Finally, we denote the set of all activation paths associated with a model M and input A as $AP_{total}(M, A)$. It holds that $AP_{total}(M, A) \subseteq P_{total}$. Essentially, activation paths are paths in a neural network topology consisting of neurons which are in the active region and the outputs of which are not muted by subsequent max pooling operations.

As used herein the phrase "activation vectors" and "activation path differentials" refers to, when considering a total order on the paths in $P_{total}$, vectors may be created that describe a set of activation paths $AP_{total}(M, A)$. An 'activation vector' $z(M, A) \in \mathbb{Z}^{|P_{total}|}$ can represent a set of activation paths $AP_{total}(M, A) \subseteq P_{total}$ if $z_i = 1$ when the i-th path of $P_{total}$ is in $AP_{total}(M, A)$, and $z_i = 0$ otherwise.

Given the definition of activation vectors above, the differential $\text{diff}(z_b, z_c)$ between two activation vectors $z_b$ (base) and $z_c$ (change) as follows:

If $z_b = 0$ and $z_c = 0$, then $\text{diff}(z_b, z_c) = 0$
If $z_b = 1$ and $z_c = 1$, then $\text{diff}(z_b, z_c) = 0$
If $z_b = 0$ and $z_c = 1$, then $\text{diff}(z_b, z_c) = 1$
If $z_b = 1$ and $z_c = 0$, then $\text{diff}(z_b, z_c) = 1$ A differential equal to 0 means that no change happened, whereas a differential equal to 1 means that a path was either inactive and was activated, or that it was active and was de-activated.

As used herein, the phrase "intersection of activation path differentials" refers to a situation in which, given two differentials, $\text{diff}_1$ and $\text{diff}_2$ of two activation vectors $z_{c1}$ and $z_{c2}$ that describe differences from the same 'base' activation vector $z_b$, we can compute an intersection vector $IV = \text{diff}_1 \cap \text{diff}_2$ as follows:

IV=1, if $\text{diff}_1 = 1$ and $\text{diff}_2 = 1$
IV=0, otherwise

The purpose of the intersection operation on differentials is to track which changes to the base activation vector are common across differentials. The operation can be extended to multiple differentials, beyond two. For example, an intersection vector may represent commonalties in the states of neurons of an attacked model when several adversarial attacks are applied to this model. Conversely, an intersection vector may represent commonalties in the states of neurons of several models which are different from each other and are attacked by the same adversarial example.

Having described various structural and functional components to implement adversarial training of neural networks using information about activation path differentials, various operations in techniques to do so will be described with reference to FIGS. 7-13. FIGS. 7-10 are flowcharts illustrating operations in a method to implement adversarial training of neural networks using information about activation path differentials in accordance with some examples.

Figure 7:
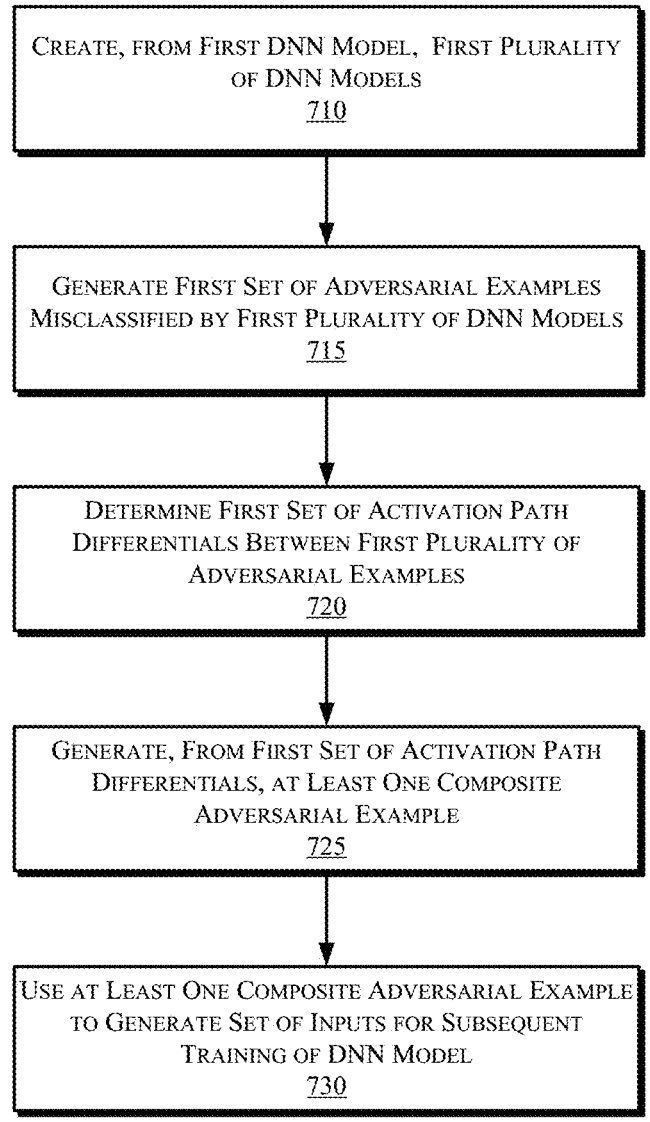
FIGS. 7-10 are flowcharts illustrating operations in a method to implement adversarial training of neural networks using information about activation path differentials in accordance with some examples.

Referring first to FIG. 7, which provides a high-level view of operations to implement adversarial training of neural networks using information about activation path differentials, at operation 710 a first plurality of DNN models are created from a first DNN model. At operation 715 a first set of adversarial examples that are misclassified by the first plurality of DNN models is generated. At operation 720 a first set of activation path differentials between the first plurality of adversarial examples are determined. At operation 725 at least one composite adversarial example is generated from the first set of activation path differentials, and at operation 730 the at least one composite adversarial example is used to generate a set of inputs for subsequent training of the DNN model. These operations will be discussed in greater detail in the following flowcharts and figures.

Figure 8:
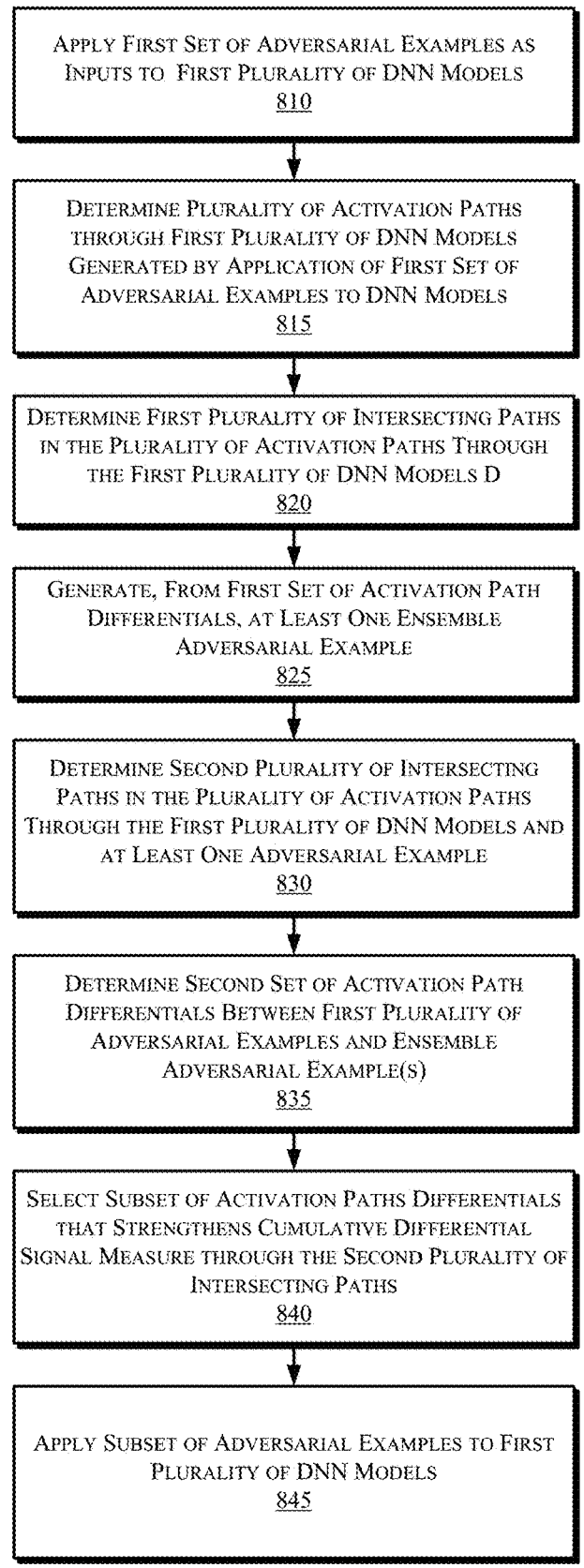
Figure 11:
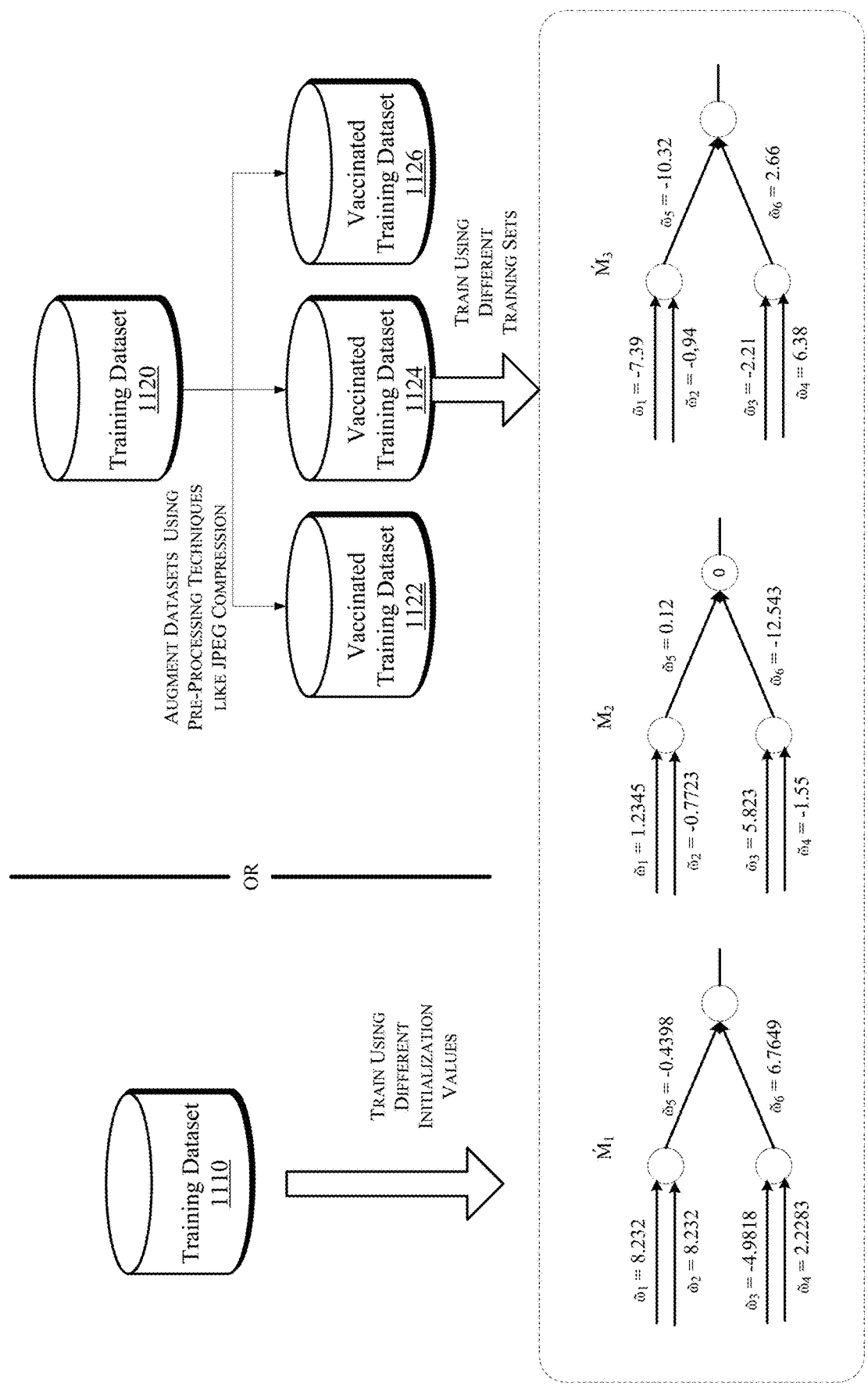

FIG. 8 presents a series of operations in one example of a method as depicted in FIG. 7. Referring to FIG. 8, at operation 810 a first set of adversarial examples are applied in an attack upon a first plurality of DNN models. Referring to FIG. 11, one technique to produce several instances of an attack is to first produce several pseudo-random instances of a functioning neural network. This procedure may involve creating a pool of different models which compute the same DNN function. There are a variety of ways to achieve this. In one example a single training dataset 1110 may be used to train multiple models using different initialization parameters. In another example a training dataset 1120 may be used to generate one or more different preprocessed (i.e., 'vaccinated') versions of the same training dataset 1122, 1124, 1126 using pre-processing techniques like JPEP compression with random quality parameters or the like. In another example several pseudo-random may be generated by applying model weight randomization techniques such as stochastic gradient descent from different random initializations, or by using random projections of the same neural network topology.

The high cost of training multiple models from scratch is one disadvantage of the above technique. Referring to FIG. 12, one way to circumvent this cost is to train a single model 1210 only, and then derive multiple slightly different versions of it by introducing pseudo-random noise to the weight parameters of the model. In some examples, randomness may be introduced by using a random seed and traditional cryptographic techniques. When using this approach to create the pool of DNNs, it is important to make sure that the additional randomness does not hurt the accuracy of the randomized models.

Referring back to FIG. 8, at operation 815 a plurality of activation paths through the first plurality of DNN models generated by the application of the first set of adversarial examples to the DNN models is determined. In some examples, to compute activation path differentials using the random instances we created at the previous step, we attack each model instance using state-of-the-art algorithms, like Projected Gradient Descent (PGD) or Carlini-Wagner (CW), to create a set $S=\{a_1, a_2, \ldots, a_n\}$ of adversarial examples. As mentioned in the outline of Section 4, these adversarial examples may also be produced by attacking different inputs to the same neural network model. The adversarial examples $\{a_1, a_2, \ldots, a_n\}$ may then be used as inputs to a set of invocations $f$ on the model instances M, as illustrated in FIG. 12. In some examples the values of invocation function $f$ may be obtained applying the model invocation definition described above. Given the invocation values, the activation paths of the models may be computed. An efficient way to do this is to perform a Depth-First, or Breadth-First Search (DFS/BFS) starting from the output vertices O. Of course, output vertices do not have any outgoing edges, so the search may be performed on a graph G' created from G by inverting all of its edges: every edge $e_{(vi,vj)} \in E$ becomes $e_{(vi,vj)}$. Also, paths that are not active need not be enumerated, so the search can ignore any path that has an inactive edge. FIG. 13 provides an example of the pseudocode 1300 for a BFS search procedure.

Once the activation paths are obtained, at operation 820, a first plurality of activation path differentials (APDs) can be determined by applying the definition of activation path differentials described above. Depending on the size of the model and the number of available paths from input to output vertices in the DNN, the paths, activation vectors, and differentials should be stored in appropriate data structures, such as arrays for small models and trees, linked lists or hash tables for larger ones.

At this point, there should be |S| activation path differentials, derived by applying each of the adversarial examples to each of the model instances. Given the differentials, we can compute their intersection by applying the definition of intersection of path differentials described above. This results in a vector in which all 1's correspond to the path changes that are common across all the differentials. In one embodiment a single intersection may be computed. In other embodiments several intersections of subsets of activation path differentials may be computed and used in subsequent operations.

The intersection(s) of the activation path differentials obtained in operation 820 may be used to generate a new adversarial example (operation 825) from the first set of adversarial examples. In some examples the intersections of activation path differentials determined in operation 820 step may contain the essential paths that need to influence the training process for the DNN as well as other paths. To distinguish between the most essential of paths returned by the previous step and other paths, an additional path filtering process may be implemented. This path filtering process removes from the set of paths considered by adversarial training, those paths that can be ignored.

The path filtering process works as follows: First, a new adversarial example which is the ensemble $a_{ens}$ of the adversarial examples $a_1, a_2, \ldots, a_n$ is computed. In some examples, the computation may be performed using as an optimization objective the minimization of a loss function $L_{ens}$ which is the sum $L_{ens} = \Sigma_{i=1}^{n} L_i$ of the loss functions $L_1, L_2, \ldots, L_n$ characterizing each of the attacks that produce $a_1, a_2, \ldots, a_n$ respectively. Essentially, the adversarial example $a_{ens}$ is the one that 'does its best' to work well in attack situations associated with all examples $a_1, a_2, \ldots, a_n$. Next, at operation 830 a second plurality of intersecting paths in the plurality of activation paths through the first plurality of DN models and the ensemble adversarial example is determined. At operation 835, a second set of activation path differentials between the first plurality of adversarial examples and the ensemble adversarial example(s) is determined. A, the intersection IV of the activation path differentials coming from $a_{ens}$ as well as $a_1, a_2, \ldots, a_n$ is computed. By computing activation path differentials coming from the ensemble adversarial example $a_{ens}$, and by intersecting that with the paths coming from $a_1, a_2, \ldots, a_n$, the necessary filtering required to identify only those paths in the network topology that are the most essential for attacking the target neural network is performed. The method can be further extended to include the computation of several ensemble examples $a_{(ens,1)}, a_{(ens,2)} \ldots$ computed from subsets of $a_1, a_2, \ldots, a_n$.

The paths associated with the intersection IV are essentially the most security critical paths or most vulnerable paths of a neural network topology. It is precisely these paths that we use for the computation of adversarial examples in this invention disclosure. It should be understood that filtering may also be accomplished in simpler ways such as by clustering adversarial samples according to similarity in differential activation paths and by selecting one representative from each cluster. Alternatively, filtering may be omitted altogether in some embodiments of the invention.

Once the most critical path(s) are determined additional adversarial training may be performed using examples that invoke those critical path(s) through the DNN. For example, existing attacks such as the PGD attack or the CW attack may be modified to take into account knowledge about the security critical paths p=IV. The modified attacks produce adversarial examples that strengthen the flow of differential signals along these paths.

There are several ways to influence the adversarial training process using the information about paths p=IV. One technique is to choose the starting points of the gradient descent process employed by attacks such as CW and PGD carefully using the information p=IV.

At operation 840 a subset of activation path differentials that strengthen a cumulative differential signal measure through the second plurality of intersecting paths is selected. For example, from the adversarial examples $\{a_{(ens,1)}, a_{(ens,2)} \ldots\} \cup \{a_1, a_2, \ldots, a_n\}$ a subset of examples $\{a_1^{(sel)},$ $a_2^{(sel)}, \ldots, a_m^{(sel)}\}$ which strengthen the paths in p=IV the most may be selected. To determine that an adversarial example a_î((sel)) strengthens the paths in p=IV the most, we employ a cumulative differential signal measure $F_M$ defined as $F_M(M,b,a_i^{(sel)},p)=\Sigma_{e\in p}|f(M,a_i^{(sel)},e)-f(M,b,e)|$, where $f$ is the model invocation function introduced in Definition 4, b is the benign input and $a_i^{(sel)}$ is an adversarial example crafted from the benign input b using some specific attack such as PGD or CW. The cumulative differential signal measure $F_M$ may also be defined as $F_M=\Sigma_{e\in p}(f(M,a_i^{(sel)},e)-f(M,b,e))^2$ or in any other similar way. This step selects m adversarial examples $\{a_1^{(sel)}, a_2^{(sel)}, \ldots, a_m^{(sel)}\}$ from the set $a_1^{(sel)}, a_2^{(sel)}, \ldots, a_m^{(sel)}\}\cup\{a_1, a_2, \ldots, a_n\}$ which result in the highest cumulative differential signal values $F_M$.

At operation 845 the subset of adversarial examples selected in operation 840 are applied to the first plurality of DNN models. In some embodiments the adversarial examples $\{a_1^{(sel)}, a_2^{(sel)}, \ldots, a_m^{(sel)}\}$ determined in the previous step are used as starting points in a gradient descent process performed by attacks such as PGD or CW. These attacks produce m new adversarial examples $\{a_1^{(p)}, a_2^{(p)}, \ldots, a_m^{(p)}\}$ using $\{a_1^{(sel)}, a_2^{(sel)}, \ldots a_m^{(sel)}\}$ as starting points, where each of the examples $\{a_1^{(p)}, a_2^{(p)}, \ldots, a_m^{(p)}\}$ corresponds to one of $\{a_1^{(sel)}, a_2^{(sel)}, \ldots, a_m^{(sel)}\}$. It is these adversarial examples $\{\{a_1^{(p)}, a_2^{(p)}, \ldots, a_m^{(p)}\}$ that are finally used in an adversarial training process to make the neural network model M more robust against adversarial attacks.

Figure 9:
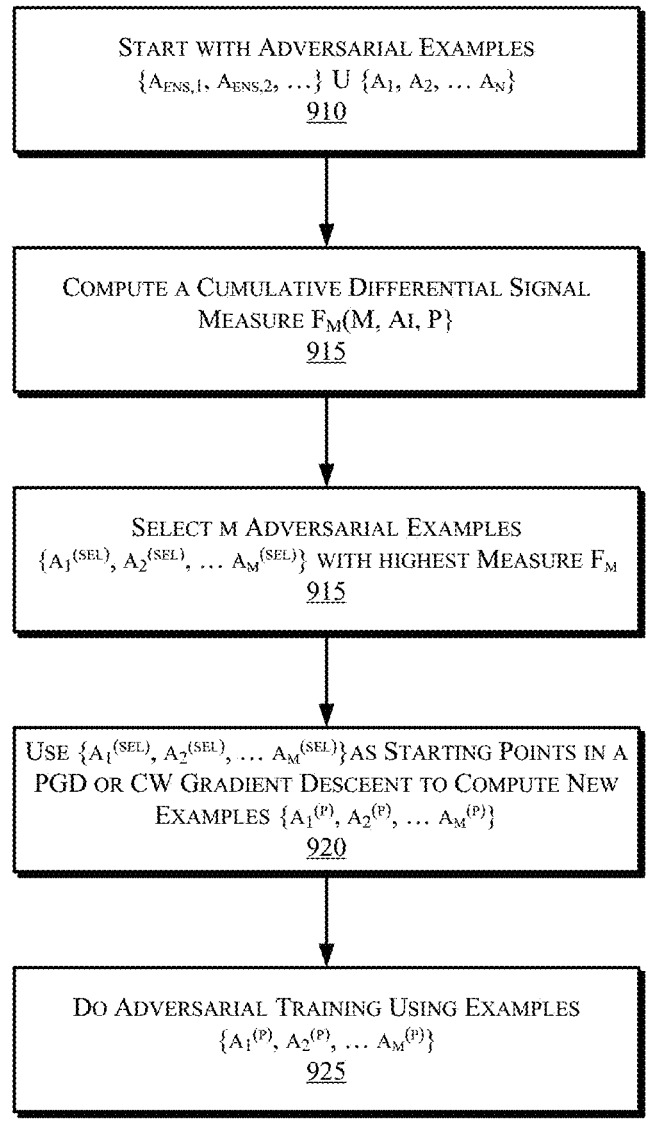

These operations are depicted in detail in FIG. 9. Referring to FIG. 9, at operation 910 the operations start with examples $\{a_{(ens,1)}, a_{(ens,2)} \ldots\}\cup\{a_1, a_2, \ldots, a_n\}$. At operation 915 a cumulative signal measure $F_M(M,b,a_i^{(sel)}, p)=\Sigma_{e\in p}|f(M, a_i^{(sel)}, e)-f(M,b,e)|$ is computed. At operation 920 a subset of M adversarial examples $\{a_1^{(sel)}, a_2^{(sel)}, \ldots, a_m^{(sel)}\}$ are selected from the set $a_1^{(sel)}, a_2^{(sel)}, \ldots, a_m^{(sel)}\}\cup\{a_1, a_2, \ldots, a_n\}$ which result in the highest cumulative differential signal values $F_M$. At operation 925 the adversarial examples $\{a_1^{(sel)}, a_2^{(sel)}, \ldots, a_m^{(sel)}\}$ determined in the previous step are used as starting points in a gradient descent process performed by attacks such as PGD or CW. These attacks produce m new adversarial examples $\{a_1^{(p)}, a_2^{(p)}, \ldots,\}$ using $\{a_1^{(sel)}, a_2^{(sel)}, \ldots, a_m^{(sel)}\}$ as starting points, where each of the examples $\{a_1^{(p)}, a_2^{(p)}, \ldots, a_m^{(p)}\}$ corresponds to one of $\{a_1^{(sel)}, a_2^{(sel)}, \ldots, a_m^{(sel)}\}$. At operation 925 these adversarial examples $\{a_1^{(p)}, a_2^{(p)}, \ldots, a_m^{(p)}\}$ are used in an adversarial training process to make the neural network model M more robust against adversarial attacks.

Figure 10:
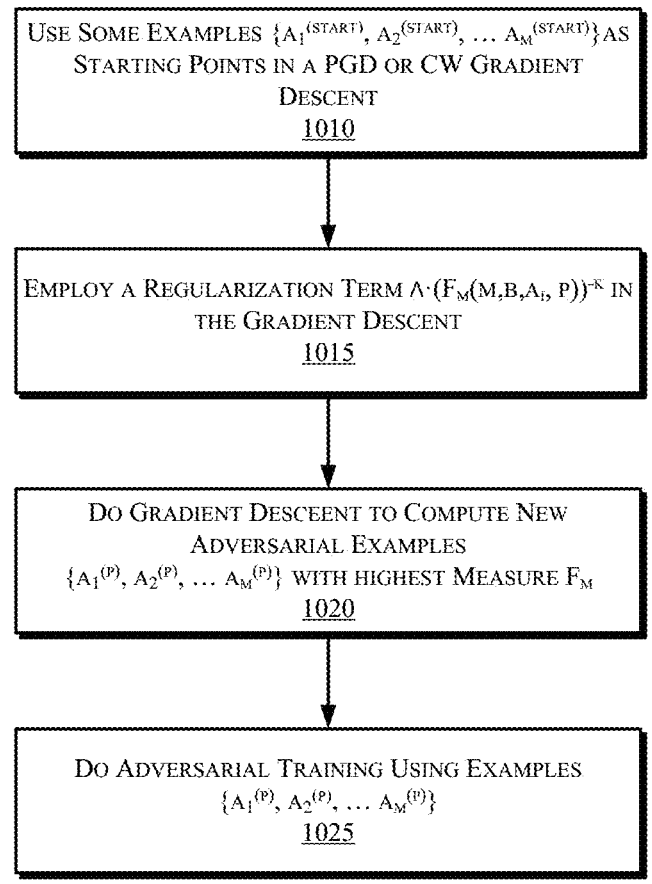

Another way to incorporate information about the most critical paths p=IV in an adversarial training process, depicted in FIG. 10, is to introduce an appropriate regularization term in the gradient descent process which implements some particular attack such as PGD or CW. The regularization term would enforce the fact that the differential signals in the paths in p should be strengthened. On example of such regularization term could be $\lambda \cdot (F_M(M,b,a_i,p))^{-k}$, where $F_M$ is the cumulative differential signal measure defined above and $-k$ is some constant negative exponent.

At operation 1010 number of m starting points $a_1^{(start)}, a_2^{(start)}, a_m^{(start)}\}$ are determined for an attack such as PGD or CW. These starting points may be selected at random. At operation 1015 an attack such as PGD or CW is performed using a regularization term that enforces the strengthening of the differential signals that flow through the paths in p. The regularization term may be for example of the form $\lambda \cdot (F_M(M, b, a_i, p))^{-k}$. The attack produces m new adversarial examples $\{a_1^{(p)}, a_2^{(p)}, \ldots, a_m^{(p)}\}$ using $a_1^{(start)}$, $a_2^{(start)}, \ldots, a_m^{(start)}\}$ as starting points for PGD or CW attacks (operation 1020). These adversarial examples $\{a_1^{(p)}, a_2^{(p)}, \ldots, a_m^{(p)}\}$ may be used to improve adversarial training (operation 1025).

The techniques described herein simplify the cost of adversarial training and also make it more effective by focusing only on paths which are associated with 'essential' visual changes that visually convert an object from a benign class A to an adversary's target class B. Such visual changes may include early gradual modifications on edges, color, texture etc. Activation path differentials associated with different adversarial examples have intersections that correspond precisely to such visual changes. These paths are strengthened when ensemble methods are used for computing adversarial examples.

Figure 14:
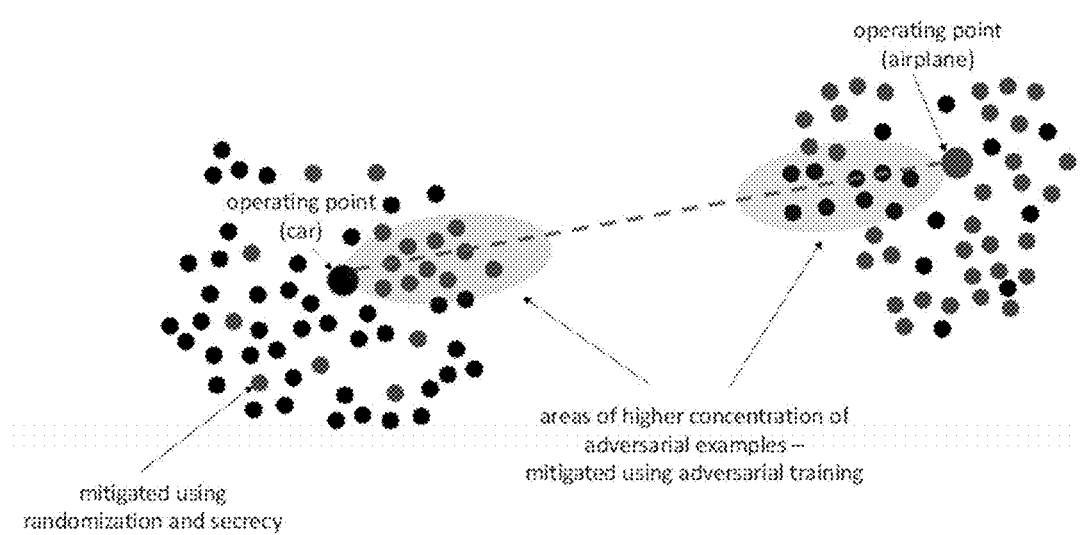
FIG. 14 is an illustration an example application of training of neural networks using information about activation path differentials in accordance with some examples.

Further, security critical paths are associated with areas around the operating points of a neural networks 1400 with increased concentration of adversarial examples, as shown in FIG. 14. Accordingly, a defense strategy that combines adversarial training with randomization can be constructed. Adversarial training can focus on defending against adversarial examples coming from these sensitive areas of increased concentration 1410 depicted in FIG. 14, a problem which can be more tractable that the generic adversarial training defense problem. The remaining adversarial examples can potentially become closer to random uniformly distributed. These could be dealt with randomization and secrecy. For example the technique based on randomizing the mantissa bits of model weights could be applied.

Figure 15:
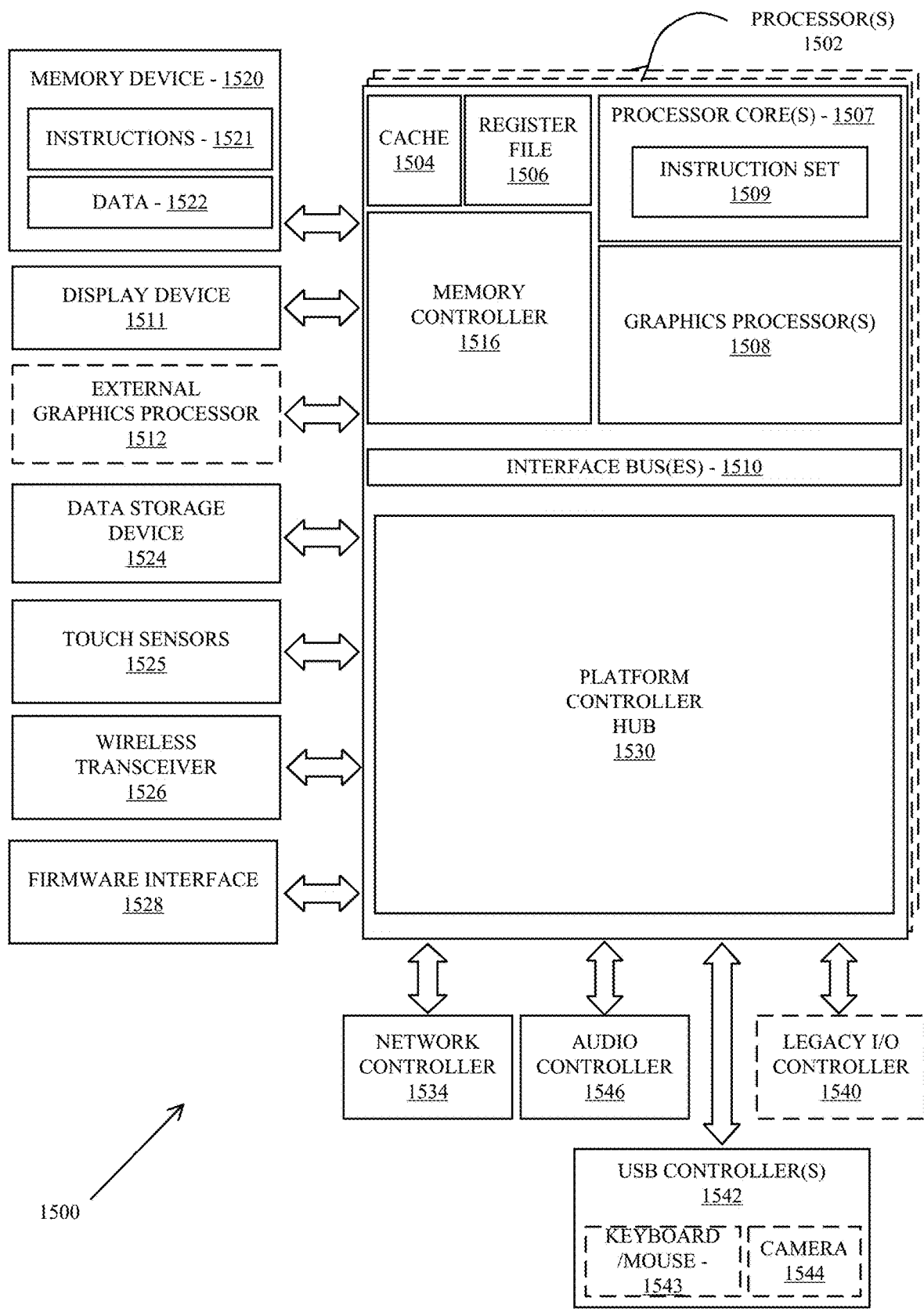
FIG. 15 is a schematic illustration of a computing architecture which may be adapted to implement adversarial training of neural networks using information about activation path differentials in accordance with some examples.

FIG. 15 illustrates an embodiment of an exemplary computing architecture that may be suitable for implementing various embodiments as previously described. In various embodiments, the computing architecture 1500 may comprise or be implemented as part of an electronic device. In some embodiments, the computing architecture 1500 may be representative, for example of a computer system that implements one or more components of the operating environments described above. In some embodiments, computing architecture 1500 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 includes one or more processors 1502 and one or more graphics processors 1508, and may be a single processor desktop system, a multiprocessor workstation system, or a server system having a large number of processors 1502 or processor cores 1507. In on embodiment, the system 1500 is a processing platform incorporated within a system-on-a-chip (SoC or SOC) integrated circuit for use in mobile, handheld, or embedded devices.

An embodiment of system 1500 can include, or be incorporated within a server-based gaming platform, a game console, including a game and media console, a mobile gaming console, a handheld game console, or an online game console. In some embodiments system 1500 is a mobile phone, smart phone, tablet computing device or mobile Internet device. Data processing system 1500 can also include, couple with, or be integrated within a wearable device, such as a smart watch wearable device, smart eyewear device, augmented reality device, or virtual reality device. In some embodiments, data processing system 1500 is a television or set top box device having one or more processors 1502 and a graphical interface generated by one or more graphics processors 1508.

In some embodiments, the one or more processors 1502 each include one or more processor cores 1507 to process instructions which, when executed, perform operations for system and user software. In some embodiments, each of the one or more processor cores 1507 is configured to process a specific instruction set 1509. In some embodiments, instruction set 1509 may facilitate Complex Instruction Set Computing (CISC), Reduced Instruction Set Computing (RISC), or computing via a Very Long Instruction Word (VLIW). Multiple processor cores 1507 may each process a different instruction set 1509, which may include instructions to facilitate the emulation of other instruction sets. Processor core 1507 may also include other processing devices, such as a Digital Signal Processor (DSP).

In some embodiments, the processor 1502 includes cache memory 1504. Depending on the architecture, the processor 1502 can have a single internal cache or multiple levels of internal cache. In some embodiments, the cache memory is shared among various components of the processor 1502. In some embodiments, the processor 1502 also uses an external cache (e.g., a Level-3 (L3) cache or Last Level Cache (LLC)) (not shown), which may be shared among processor cores 1507 using known cache coherency techniques. A register file 1506 is additionally included in processor 1502 which may include different types of registers for storing different types of data (e.g., integer registers, floating point registers, status registers, and an instruction pointer register). Some registers may be general-purpose registers, while other registers may be specific to the design of the processor 1502.

In some embodiments, one or more processor(s) 1502 are coupled with one or more interface bus(es) 1510 to transmit communication signals such as address, data, or control signals between processor 1502 and other components in the system. The interface bus 1510, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 1502 include an integrated memory controller 1516 and a platform controller hub 1530. The memory controller 1516 facilitates communication between a memory device and other components of the system 1500, while the platform controller hub (PCH) 1530 provides connections to I/O devices via a local I/O bus.

Memory device 1520 can be a dynamic random-access memory (DRAM) device, a static random-access memory (SRAM) device, flash memory device, phase-change memory device, or some other memory device having suitable performance to serve as process memory. In one embodiment the memory device 1520 can operate as system memory for the system 1500, to store data 1522 and instructions 1521 for use when the one or more processors 1502 executes an application or process. Memory controller hub 1516 also couples with an optional external graphics processor 1512, which may communicate with the one or more graphics processors 1508 in processors 1502 to perform graphics and media operations. In some embodiments a display device 1511 can connect to the processor(s) 1502. The display device 1511 can be one or more of an internal display device, as in a mobile electronic device or a laptop device or an external display device attached via a display interface (e.g., DisplayPort, etc.). In one embodiment the display device 1511 can be a head mounted display (HMD) such as a stereoscopic display device for use in virtual reality (VR) applications or augmented reality (AR) applications.

In some embodiments the platform controller hub 1530 enables peripherals to connect to memory device 1520 and processor 1502 via a high-speed I/O bus. The I/O peripherals include, but are not limited to, an audio controller 1546, a network controller 1534, a firmware interface 1528, a wireless transceiver 1526, touch sensors 1525, a data storage device 1524 (e.g., hard disk drive, flash memory, etc.). The data storage device 1524 can connect via a storage interface (e.g., SATA) or via a peripheral bus, such as a Peripheral Component Interconnect bus (e.g., PCI, PCI Express). The touch sensors 1525 can include touch screen sensors, pressure sensors, or fingerprint sensors. The wireless transceiver 1526 can be a Wi-Fi transceiver, a Bluetooth transceiver, or a mobile network transceiver such as a 3G, 4G, or Long Term Evolution (LTE) transceiver. The firmware interface 1528 enables communication with system firmware, and can be, for example, a unified extensible firmware interface (UEFI). The network controller 1534 can enable a network connection to a wired network. In some embodiments, a high-performance network controller (not shown) couples with the interface bus 1510. The audio controller 1546, in one embodiment, is a multi-channel high definition audio controller. In one embodiment the system 1500 includes an optional legacy I/O controller 1540 for coupling legacy (e.g., Personal System 2 (PS/2)) devices to the system. The platform controller hub 1530 can also connect to one or more Universal Serial Bus (USB) controllers 1542 connect input devices, such as keyboard and mouse 1543 combinations, a camera 1544, or other USB input devices.

Figure 16:
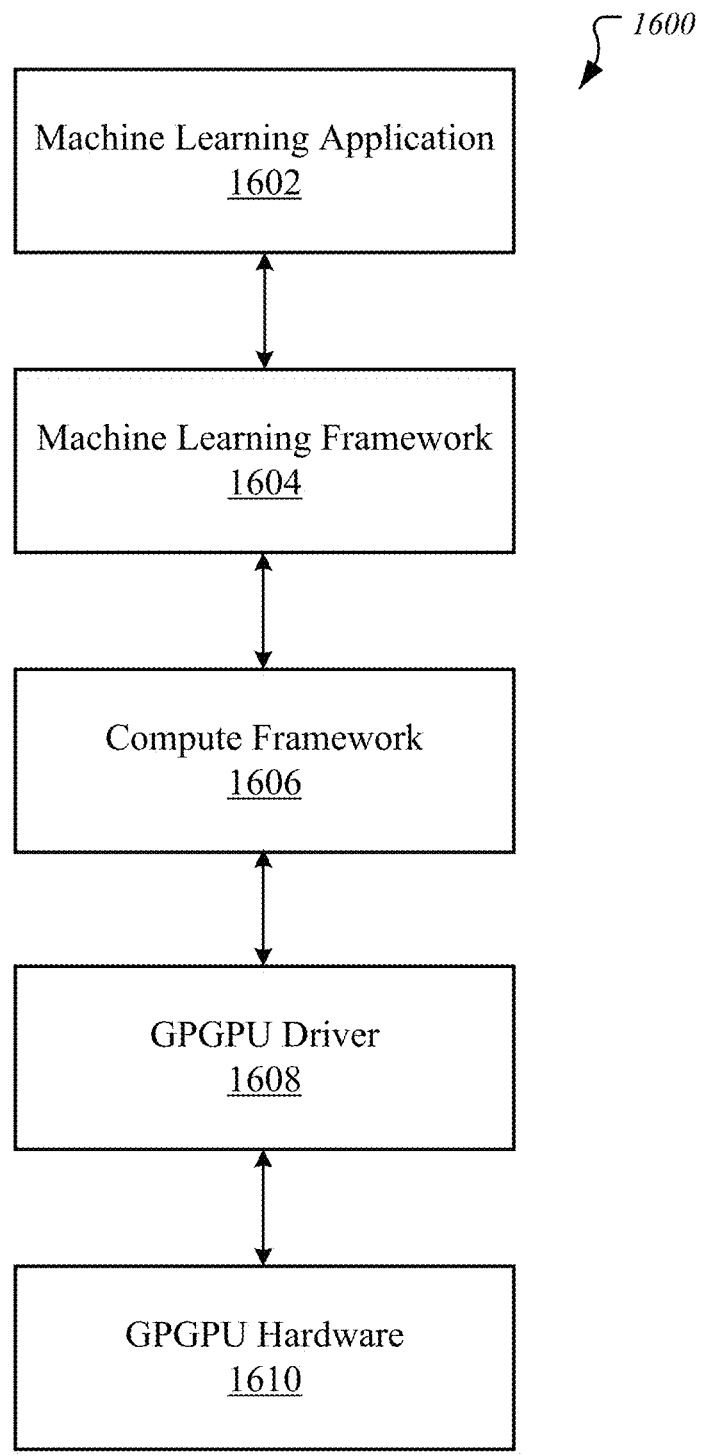
FIG. 16 illustrates a machine learning software stack according to one embodiment.

FIG. 16 is a schematic illustration of a machine learning software stack 1600 according to one embodiment. Although FIG. 16 illustrates a software stack for general-purpose GPU (GPGPU) operations, a machine learning software stack is not limited to this example and may include, for example, a machine learning software stack for CPU operations. A machine learning application 1602 can be configured to train a neural network using a training dataset or to use a trained deep neural network to implement machine intelligence. The machine learning application 1602 can include training and inference functionality for a neural network and/or specialized software that can be used to train a neural network before deployment. The machine learning application 1602 can implement any type of machine intelligence including but not limited to image recognition, mapping and localization, autonomous navigation, speech synthesis, medical imaging, or language translation Hardware acceleration for the machine learning application 1602 can be enabled via a machine learning framework 1604. The machine learning framework 1604 can provide a library of machine learning primitives. Machine learning primitives are basic operations that are commonly performed by machine learning algorithms. Without the machine learning framework 1604, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 1604. Exemplary primitives include tensor convolutions, activation functions, and pooling, which are computational operations that are performed while training a convolutional neural network (CNN). The machine learning framework 1604 can also provide primitives to implement basic linear algebra subprograms performed by many machine-learning algorithms, such as matrix and vector operations.

The machine learning framework 1604 can process input data received from the machine learning application 1602 and generate the appropriate input to a compute framework 1606. The compute framework 1606 can abstract the underlying instructions provided to the GPGPU driver 1608 to enable the machine learning framework 1604 to take advantage of hardware acceleration via the GPGPU hardware 1610 without requiring the machine learning framework 1604 to have intimate knowledge of the architecture of the GPGPU hardware 1610. Additionally, the compute framework 1606 can enable hardware acceleration for the machine learning framework 1604 across a variety of types and generations of the GPGPU hardware 1610.

The computing architecture provided by embodiments described herein can be trained and learn to perform the types of parallel processing that are computationally equivalent to training and deploying neural networks for machine learning. The computing architecture provided by embodiments described herein differs from Deep Neural Networks (DNNs), Convolutional Neural Networks or Recurrent Neural Networks (RNNs) with respect to both the functionality types of neurons deployed and with respect to the computation steps which the training process comprises. Even though the computing architecture provided differs from neural networks such as CNNs, DNNs or RNNs, some of the computations performed by this architecture may be equivalent to the computations performed by neural networks such as CNNs, DNNs or RNNs. Other computations performed by the computing architecture provided may not be possible if attempted by neural networks such as CNNs, DNNs or RNNs. This is the reason why the computing architecture provided by embodiments described herein addresses the robustness and precision issues associated with neural networks such as CNNs, DNNs or RNNs. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 17A:
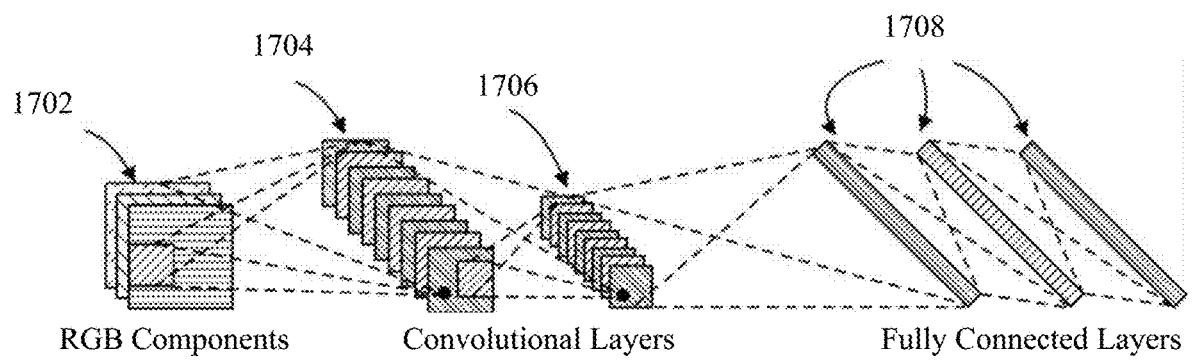
FIG. 17A is a schematic illustration of neural network layers in accordance with some examples.
Figure 17B:
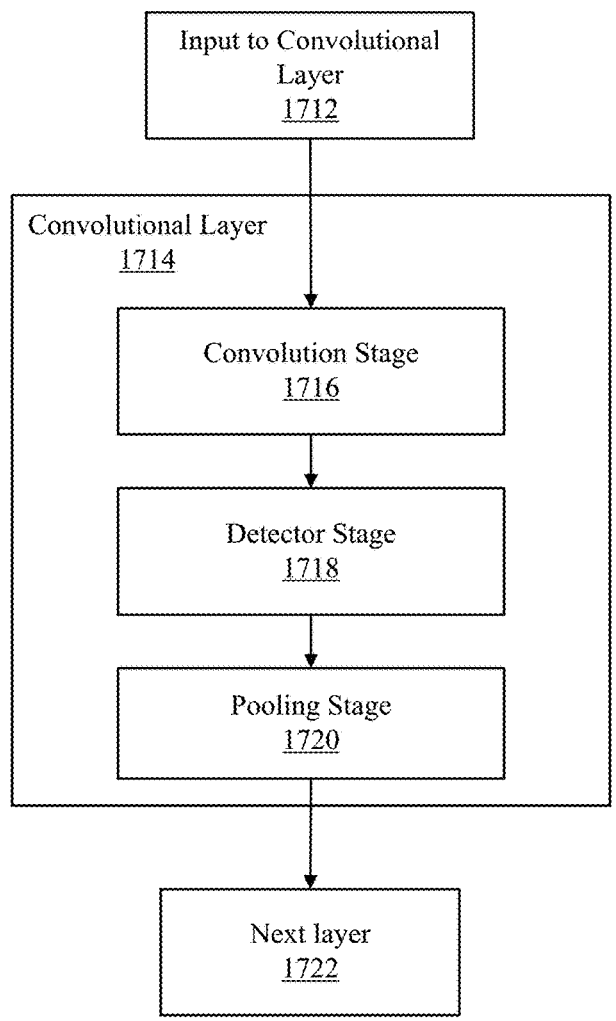
FIG. 17B is a schematic illustration of computation stages associated with neural network layers in accordance with some examples.

FIG. 17A is a schematic illustration of neural network layers according to one embodiment. FIG. 17B is a schematic illustration of computation stages associated with neural network layers according to one embodiment. FIG. 17A illustrates various layers within a CNN. As shown in FIG. 17A, an exemplary CNN used to model image processing can receive input 1702 describing the red, green, and blue (RGB) components of an input image. The input 1702 can be processed by multiple convolutional layers (e.g., first convolutional layer 1704, second convolutional layer 1706). The output from the multiple convolutional layers may optionally be processed by a set of fully connected layers 1708. Neurons in a fully connected layer have full connections to all activations in the previous layer, as previously described for a feedforward network. The output from the fully connected layers 1708 can be used to generate an output result from the network. The activations within the fully connected layers 1708 can be computed using matrix multiplication instead of convolution. Not all CNN implementations are make use of fully connected layers 1708. For example, in some implementations the second convolutional layer 1706 can generate output for the CNN.

The convolutional layers are sparsely connected, which differs from traditional neural network configuration found in the fully connected layers 1708. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 17B illustrates exemplary computation stages within a convolutional layer of a CNN. Input to a convolutional layer 1712 of a CNN can be processed in three stages of a convolutional layer 1714. The three stages can include a convolution stage 1716, a detector stage 1718, and a pooling stage 1720. The convolution layer 1714 can then output data to a successive convolutional layer. The final convolutional layer of the network can generate output feature map data or provide input to a fully connected layer, for example, to generate a classification value for the input to the CNN.

In the convolution stage 1716 performs several convolutions in parallel to produce a set of linear activations. The convolution stage 1716 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 1716 defines a set of linear activations that are processed by successive stages of the convolutional layer 1714.

The linear activations can be processed by a detector stage 1718. In the detector stage 1718, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max\mathbb{Z}(0,x)$, such that the activation is thresholded at zero.

The pooling stage 1720 uses a pooling function that replaces the output of the second convolutional layer 1706 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 1720, including max pooling, average pooling, and l2-norm pooling. Additionally, some CNN implementations do not include a pooling stage. Instead, such implementations substitute an additional convolution stage having an increased stride relative to previous convolution stages The output from the convolutional layer 1714 can then be processed by the next layer 1722. The next layer 1722 can be an additional convolutional layer or one of the fully connected layers 1708. For example, the first convolutional layer 1704 of FIG. 17A can output to the second convolutional layer 1706, while the second convolutional layer can output to a first layer of the fully connected layers 1708.

The following pertains to further examples.

Example 1 is an apparatus comprising a memory and a processor to create, from a first deep neural network (DNN) model, a first plurality of DNN models; generate a first set of adversarial examples that are misclassified by the first plurality of deep neural network (DNN) models; determine a first set of activation path differentials between the first plurality of adversarial examples; generate, from the first set of activation path differentials, at least one composite adversarial example which incorporates at least one intersecting critical path that is shared between at least two adversarial examples in the first set of adversarial examples; and use the at least one composite adversarial example to generate a set of inputs for a subsequent training iteration of the DNN model.

In Example 2, the subject matter of Example 1 can optionally a processor to introduce pseudo-random noise into one or more weight parameters of the first DNN model to generate a derivative DNN model from the first DNN model.

In Example 3, the subject matter of any one of Examples 1-2 can optionally include a processor to apply the first set of adversarial examples as inputs to the first plurality of DNN models.

In Example 4, the subject matter of any one of Examples 1-3 can optionally include a processor to determine a first plurality of intersecting paths in a plurality of activation paths through the first plurality of DNN models.

In Example 5, the subject matter of any one of Examples 1-4 can optionally include a processor to generate at least one ensemble adversarial example from the first set of adversarial examples; determine a second plurality of intersecting paths in the plurality of activation paths through the first plurality of DNN models and the at least one adversarial example; determine a second set of activation path differentials between the first plurality of adversarial examples and the ensemble adversarial example; select, from the second set of activation path differentials, a subset of activation path differentials that strengthens a cumulative differential signal measure through the second plurality of intersecting paths; and apply the subset of adversarial examples as inputs to the first plurality of DNN models.

In Example 6, the subject matter of any one of Examples 1-5 can optionally include a processor to select at least one generated composite adversarial example to use as a starting point in a gradient descent adversarial attack.

In Example 7, the subject matter of any one of Examples 1-6 can optionally include a processor to employ a regularization term that includes a cumulative differential signal measure in the gradient descent adversarial attack to generate a second set of adversarial examples to use in subsequent adversarial attacks.

Example 8 is a non-transitory computer-readable medium comprising instructions which, when executed by a processor, configure the processor to create, from a first deep neural network (DNN) model, a first plurality of DNN models; generate a first set of adversarial examples that are misclassified by the first plurality of deep neural network (DNN) models; determine a first set of activation path differentials between the first plurality of adversarial examples; generate, from the first set of activation path differentials, at least one composite adversarial example which incorporates at least one intersecting critical path that is shared between at least two adversarial examples in the first set of adversarial examples; and use the at least one composite adversarial example to generate a set of inputs for a subsequent training iteration of the DNN model.

In Example 9, the subject matter of example 8 can optionally include further comprising instructions which, when executed by the processor, configure the processor to introduce pseudo-random noise into one or more weight parameters of the first DNN model to generate a derivative DNN model from the first DNN model.

In Example 10, the subject matter of any one of examples 8-9 can optionally include further comprising instructions which, when executed by the processor, configure the processor to apply the first set of adversarial examples as inputs to the first plurality of DNN models.

In Example 11, the subject matter of any one of Examples 8-10 can optionally include logic, at least partially including hardware logic, configured to determine a first plurality of intersecting paths in a plurality of activation paths through the first plurality of DNN models.

In Example 12, the subject matter of any one of Examples 8-11 can optionally include further comprising instructions which, when executed by the processor, configure the processor to generate at least one ensemble adversarial example from the first set of adversarial examples; determine a second plurality of intersecting paths in the plurality of activation paths through the first plurality of DNN models and the at least one adversarial example; determine a second set of activation path differentials between the first plurality of adversarial examples and the ensemble adversarial example; select, from the second set of activation path differentials, a subset of activation path differentials that strengthens a cumulative differential signal measure through the second plurality of intersecting paths; and apply the subset of adversarial examples as inputs to the first plurality of DNN models.

In Example 13, the subject matter of any one of Examples 8-12 can optionally include further comprising instructions which, when executed by the processor, configure the processor to select at least one generated composite adversarial example to use as a starting point in a gradient descent adversarial attack.

In Example 14, the subject matter of any one of Examples 8-13 can optionally include further comprising instructions which, when executed by the processor, configure the processor to employ a regularization term that includes a cumulative differential signal measure in the gradient descent adversarial attack to generate a second set of adversarial examples to use in subsequent adversarial attacks.

Example 15 is a computer-implemented method, comprising creating, from a first deep neural network (DNN) model, a first plurality of DNN models; generating a first set of adversarial examples that are misclassified by the first plurality of deep neural network (DNN) models, determining a first set of activation path differentials between the first plurality of adversarial examples; generating, from the first set of activation path differentials, at least one composite adversarial example which incorporates at least one intersecting critical path that is shared between at least two adversarial examples in the first set of adversarial examples; and using the at least one composite adversarial example to generate a set of inputs for a subsequent training iteration of the DNN model.

In Example 16, the subject matter of example 15 further comprising introducing pseudo-random noise into one or more weight parameters of the first DNN model to generate a derivative DNN model from the first DNN model.

In Example 17, the subject matter of any one of Examples 15-16 further comprising applying the first set of adversarial examples as inputs to the first plurality of DNN models.

In Example 18, the subject matter of any one of Examples 15-17 further comprising determining a first plurality of intersecting paths in a plurality of activation paths through the first plurality of DNN models.

In Example 19, the subject matter of any one of Examples 15-18 further comprising generating at least one ensemble adversarial example from the first set of adversarial examples, determining a second plurality of intersecting paths in the plurality of activation paths through the first plurality of DNN models and the at least one adversarial example; determining a second set of activation path differentials between the first plurality of adversarial examples and the ensemble adversarial example; selecting, from the second set of activation path differentials, a subset of activation path differentials that strengthens a cumulative differential signal measure through the second plurality of intersecting paths; and applying the subset of adversarial examples as inputs to the first plurality of DNN models.

In Example 20, the subject matter of any one of Examples 15-19 further comprising selecting at least one generated composite adversarial example to use as a starting point in a gradient descent adversarial attack.

In Example 21, the subject matter of any one of Examples 15-20 further comprising employ a regularization term that includes a cumulative differential signal measure in the gradient descent adversarial attack to generate a second set of adversarial examples to use in subsequent adversarial attacks.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

Having described various structural components to implement background estimation for object segmentation using coarse-level tracking, operations to implement background estimation for object segmentation using coarse-level tracking will be described with reference to FIGS. 16-18. In some examples the operations depicted in FIG. 16 may be implemented by the background estimator(s) 1522, alone or in combination with other components of a client system 1500 depicted in FIG. 15.

What is claimed is:

1. An apparatus, comprising:
   a memory; and
   a processor to:
   create, from a first deep neural network (DNN) model, a first plurality of DNN models;
   generate a first set of adversarial examples that are misclassified by the first plurality of deep neural network (DNN) models;
   determine a first set of activation path differentials between the first plurality of adversarial examples, each activation path in the first set of activation paths characterized by a loss function;
   generate, from the first set of activation path differentials, at least one composite adversarial example which incorporates at least one intersecting critical path that is shared between at least two adversarial examples in the first set of adversarial examples, the at least one composite adversarial example selected to minimize a sum of the loss functions of the activation paths in the first set of activation paths; and
   use the at least one composite adversarial example to generate a set of inputs for a subsequent training iteration of the DNN model.

2. The apparatus of claim 1, the processor to:
   introduce pseudo-random noise into one or more weight parameters of the first DNN model to generate a derivative DNN model from the first DNN model.

3. The apparatus of claim 1, the processor to:
   apply the first set of adversarial examples as inputs to the first plurality of DNN models.

4. The apparatus of claim 3, the processor to:
   determine a first plurality of intersecting paths in a plurality of activation paths through the first plurality of DNN models.

5. The apparatus of claim 4, the processor to:
   generate at least one ensemble adversarial example from the first set of adversarial examples;
   determine a second plurality of intersecting paths in the plurality of activation paths through the first plurality of DNN models and the at least one adversarial example;
   determine a second set of activation path differentials between the first plurality of adversarial examples and the ensemble adversarial example;

select, from the second set of activation path differentials, a subset of activation path differentials that strengthens a cumulative differential signal measure through the second plurality of intersecting paths; and apply the subset of adversarial examples as inputs to the first plurality of DNN models.

6. The apparatus of claim 1, the processor to:

select at least one generated composite adversarial example to use as a starting point in a gradient descent adversarial attack.

7. The apparatus of claim 6, the processor to:

employ a regularization term that includes a cumulative differential signal measure in the gradient descent adversarial attack to generate a second set of adversarial examples to use in subsequent adversarial attacks.

8. A non-transitory computer-readable medium comprising instructions which, when executed by a processor, configure the processor to:

create, from a first deep neural network (DNN) model, a first plurality of DNN models;

generate a first set of adversarial examples that are misclassified by the first plurality of deep neural network (DNN) models;

determine a first set of activation path differentials between the first plurality of adversarial examples, each activation path in the first set of activation paths characterized by a loss function;

generate, from the first set of activation path differentials, at least one composite adversarial example which incorporates at least one intersecting critical path that is shared between at least two adversarial examples in the first set of adversarial examples, the at least one composite adversarial example selected to minimize a sum of the loss functions of the activation paths in the first set of activation paths; and use the at least one composite adversarial example to generate a set of inputs for a subsequent training iteration of the DNN model.

9. The non-transitory computer-readable medium of claim 8, further comprising instructions which, when executed by the processor, configure the processor to:

introduce pseudo-random noise into one or more weight parameters of the first DNN model to generate a derivative DNN model from the first DNN model.

10. The non-transitory computer-readable medium of claim 8, further comprising instructions which, when executed by the processor, configure the processor to:

apply the first set of adversarial examples as inputs to the first plurality of DNN models.

11. The non-transitory computer-readable medium of claim 10, further comprising instructions which, when executed by the processor, configure the processor to:

determine a first plurality of intersecting paths in a plurality of activation paths through the first plurality of DNN models.

12. The non-transitory computer-readable medium of claim 11, further comprising instructions which, when executed by the processor, configure the processor to:

generate at least one ensemble adversarial example from the first set of adversarial examples;

determine a second plurality of intersecting paths in the plurality of activation paths through the first plurality of DNN models and the at least one adversarial example;

determine a second set of activation path differentials between the first plurality of adversarial examples and the ensemble adversarial example;

select, from the second set of activation path differentials, a subset of activation path differentials that strengthens a cumulative differential signal measure through the second plurality of intersecting paths; and apply the subset of adversarial examples as inputs to the first plurality of DNN models.

13. The non-transitory computer-readable medium of claim 8, further comprising instructions which, when executed by the processor, configure the processor to:

select at least one generated composite adversarial example to use as a starting point in a gradient descent adversarial attack.

14. The non-transitory computer-readable medium of claim 13, further comprising instructions which, when executed by the processor, configure the processor to:

employ a regularization term that includes a cumulative differential signal measure in the gradient descent adversarial attack to generate a second set of adversarial examples to use in subsequent adversarial attacks.

15. A computer-implemented method, comprising:

creating, from a first deep neural network (DNN) model, a first plurality of DNN models;

generating a first set of adversarial examples that are misclassified by the first plurality of deep neural network (DNN) models;

determining a first set of activation path differentials between the first plurality of adversarial examples, each activation path in the first set of activation paths characterized by a loss function;

generating, from the first set of activation path differentials, at least one composite adversarial example which incorporates at least one intersecting critical path that is shared between at least two adversarial examples in the first set of adversarial examples, the at least one composite adversarial example selected to minimize a sum of the loss functions of the activation paths in the first set of activation paths; and using the at least one composite adversarial example to generate a set of inputs for a subsequent training iteration of the DNN model.

16. The computer-implemented method of claim 15, further comprising:

introducing pseudo-random noise into one or more weight parameters of the first DNN model to generate a derivative DNN model from the first DNN model.

17. The computer-implemented method of claim 15, further comprising:

applying the first set of adversarial examples as inputs to the first plurality of DNN models.

18. The computer-implemented method of claim 17, further comprising:

determining a first plurality of intersecting paths in a plurality of activation paths through the first plurality of DNN models.

19. The computer-implemented method of claim 15, further comprising:

generating at least one ensemble adversarial example from the first set of adversarial examples;

determining a second plurality of intersecting paths in the plurality of activation paths through the first plurality of DNN models and the at least one adversarial example;

determining a second set of activation path differentials between the first plurality of adversarial examples and the ensemble adversarial example;

selecting, from the second set of activation path differentials, a subset of activation path differentials that strengthens a cumulative differential signal measure through the second plurality of intersecting paths; and applying the subset of adversarial examples as inputs to the first plurality of DNN models.

20. The computer-implemented method of claim 15, further comprising:

selecting at least one generated composite adversarial example to use as a starting point in a gradient descent adversarial attack.

21. The computer-implemented method of claim 20, further comprising:

employing a regularization term that includes a cumulative differential signal measure in the gradient descent adversarial attack to generate a second set of adversarial examples to use in subsequent adversarial attacks.

* * * * *